United States Patent [19]

Tanaka et al.

[11] 4,393,502
[45] Jul. 12, 1983

[54] METHOD AND APPARATUS FOR COMMUNICATING DIGITAL INFORMATION WORDS BY ERROR-CORRECTION ENCODING

[76] Inventors: Masato Tanaka; Shunsuke Furukawa; Ikuo Iwamoto; Toshitada Doi, all of Sony Corp., 6-7-35, Kitashinagawa, Shinagawa-Ku, Tokyo, Japan

[21] Appl. No.: 195,625

[22] Filed: Oct. 9, 1980

[30] Foreign Application Priority Data

Oct. 9, 1979 [JP] Japan ................................ 54-130310

[51] Int. Cl.³ .............................................. G06F 11/10
[52] U.S. Cl. ........................................ 371/40; 371/38; 371/45
[58] Field of Search ...................... 371/37, 38, 39, 40, 371/43, 45

[56] References Cited

U.S. PATENT DOCUMENTS

| | | | |
|---|---|---|---|
| 4,146,099 | 3/1979 | Matsushima et al. | 371/51 |
| 4,188,616 | 2/1980 | Kazami et al. | 371/37 |
| 4,206,440 | 6/1980 | Doi et al. | 371/38 |
| 4,211,997 | 7/1980 | Rudnick et al. | 371/40 |
| 4,238,852 | 12/1980 | Iga et al. | 371/40 |
| 4,254,500 | 6/1981 | Brookhart | 371/38 |
| 4,276,646 | 6/1981 | Haggard et al. | 371/37 |

FOREIGN PATENT DOCUMENTS 2012460 7/1979 United Kingdom .

*Primary Examiner*—Charles E. Atkinson

[57] ABSTRACT

A method and appratus are provided for communicating a sequence of digital information words. The information words are separated into a sequence of odd information words and a sequence of even information words. The separated odd and even information words are time-displaced from each other by a predetermined amount. The odd information words are encoded in an error-correcting code, and the even information words are separately encoded in a similar error-correcting code. The encoded time-displaced odd and even information words are combined into a transmission block, and this transmission block is transmitted or recorded. In one embodiment, the information words are encoded by generating an error-correcting word in response to the odd information words and by generating an error-correcting word in response to the even information words. The respective error-correcting words are interleaved with the odd and even information words. To recover the original information words, the transmission block is received and the odd and even information words are decoded so as to correct errors therein. The time displacement between the decoded off and even information words are removed. If an information word contains an uncorrected error therein, a correct information word is approximated therefor by interpolating adjacent decoded odd or even information words so as to approximate a correct even or odd information word, respectively. A corrected sequence of information words formed of the decoded and approximated information words is recovered.

43 Claims, 23 Drawing Figures

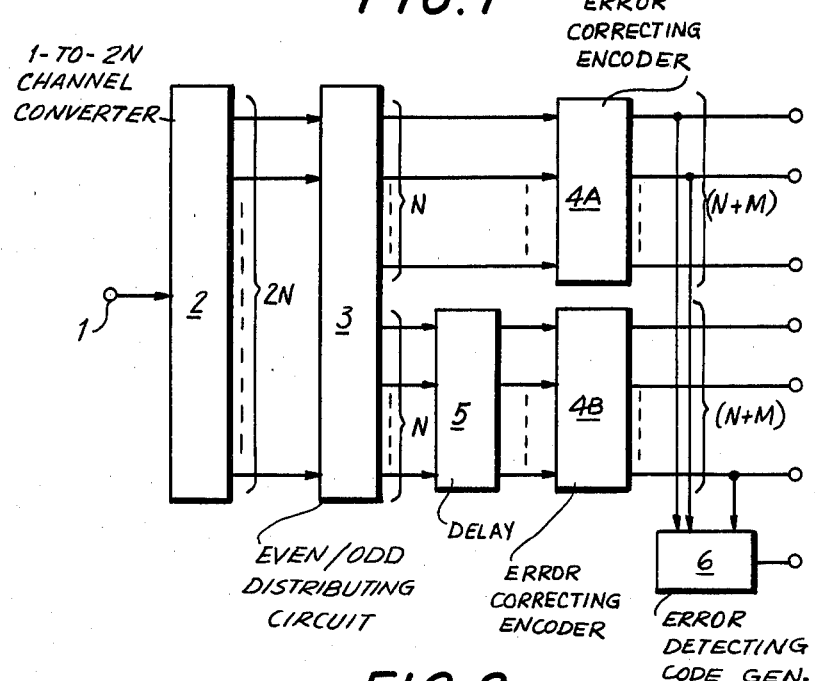
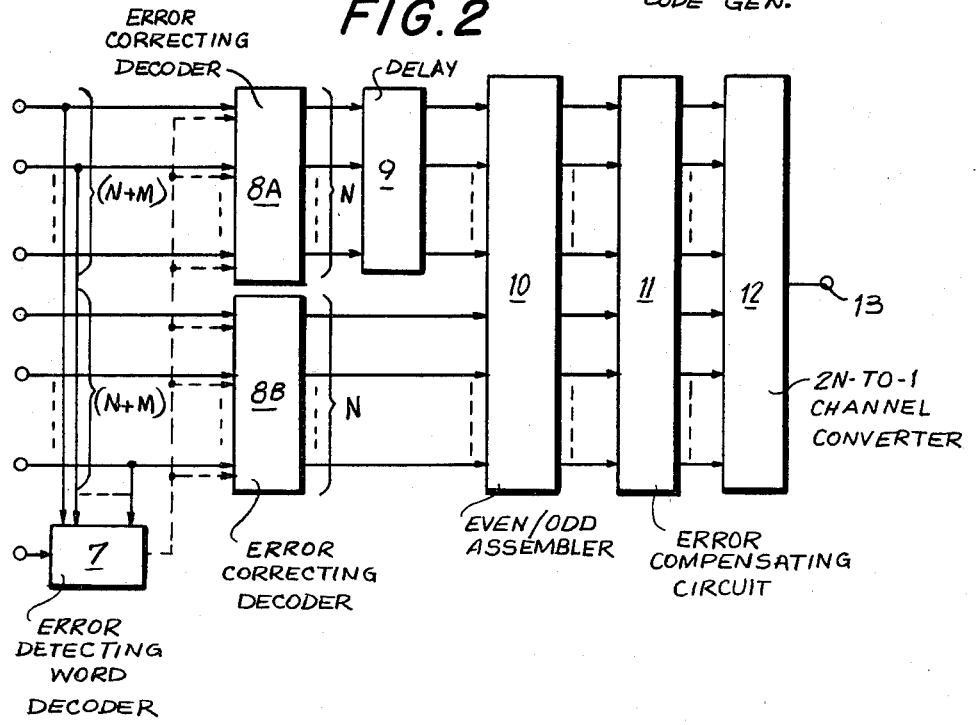

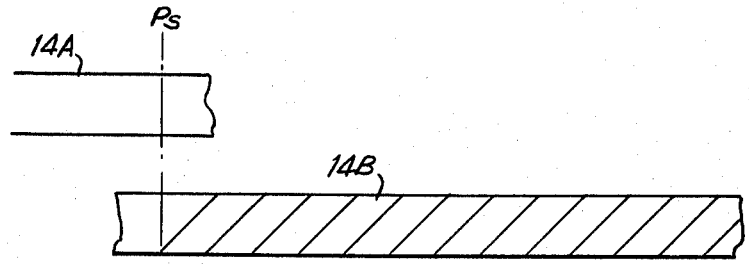
FIG.3A
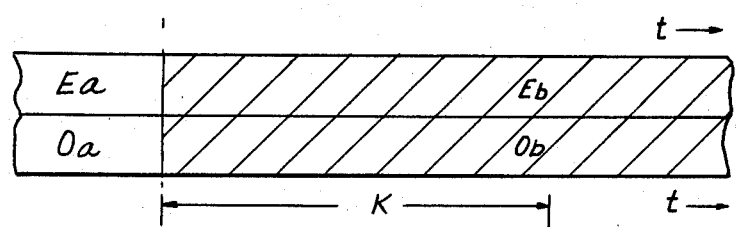
FIG.3B
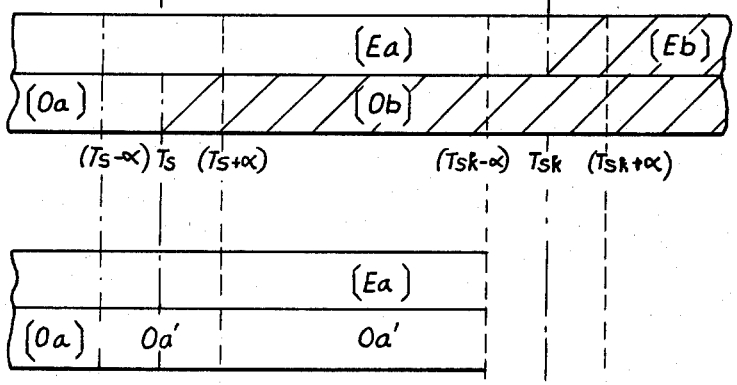
FIG.3C
FIG.3D
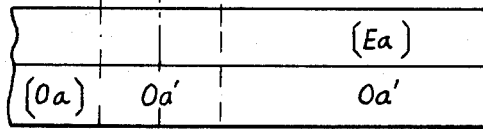
FIG.3E
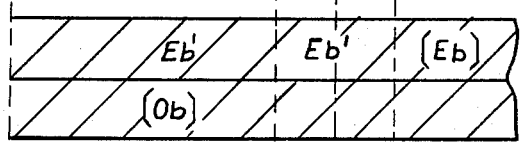

FIG.6

| n | $SW_0$ $(4n)$ | $SW_{12}$ $(4n-62)$ | $SP_{10}$ $(4n-128)$ | $SQ_{10}$ $(4n-168)$ | $SW_1$ $(4n-219)$ | $SW_{13}$ $(4n-281)$ | $SP_{11}$ $(4n-347)$ | $SQ_{11}$ $(4n-387)$ |
|---|---|---|---|---|---|---|---|---|
| -1 | -4 | -66 | -132 | -172 | -223 | -285 | -351 | -391 |
| 0 | 0 | -62 | -128 | -168 | -219 | -281 | -347 | -387 |
| 1 | 4 | -58 | -124 | -164 | -215 | -277 | -343 | -383 |
| ⋮ | ⋮ | ⋮ | ⋮ | ⋮ | ⋮ | ⋮ | ⋮ | ⋮ |
| 14 | 52 | -6 | -72 | -112 | -163 | -225 | -291 | -331 |
| 15 | 56 | -2 | -68 | -108 | -159 | -221 | -287 | -327 |
| 16 | 64 | 2 | -64 | -104 | -155 | -217 | -283 | -323 |
| 17 | 68 | 6 | -60 | -100 | -151 | -213 | -279 | -319 |
| ⋮ | ⋮ | ⋮ | ⋮ | ⋮ | ⋮ | ⋮ | ⋮ | ⋮ |
| 28 | 112 | 50 | -16 | -56 | -107 | -169 | -235 | -275 |
| ⋮ | ⋮ | ⋮ | ⋮ | ⋮ | ⋮ | ⋮ | ⋮ | ⋮ |
| 32 | 128 | 66 | 0 | -40 | -91 | -153 | -219 | -259 |
| 33 | 132 | 70 | 4 | -36 | -87 | -149 | -215 | -255 |
| ⋮ | ⋮ | ⋮ | ⋮ | ⋮ | ⋮ | ⋮ | ⋮ | ⋮ |
| 42 | 168 | 106 | 40 | 0 | -51 | -113 | -179 | -219 |
| ⋮ | ⋮ | ⋮ | ⋮ | ⋮ | ⋮ | ⋮ | ⋮ | ⋮ |
| 48 | 192 | 130 | 64 | 24 | -27 | -89 | -155 | -195 |
| 49 | 196 | 134 | 68 | 28 | -23 | -85 | -151 | -191 |
| ⋮ | ⋮ | ⋮ | ⋮ | ⋮ | ⋮ | ⋮ | ⋮ | ⋮ |
| 55 | 220 | 158 | 92 | 52 | 1 | -61 | -127 | -167 |

| $W_0$ | $W_{-62}$ | $P_{-128}$ | $Q_{-168}$ | $W_{-219}$ | $W_{-281}$ | $P_{-347}$ | $Q_{-387}$ | CRC | SYNC |

FIG. 10

| n | $SW_{10}$ (4n-168) | $SW_{102}$ (4n-112) | $SP_{100}$ (4n-56) | $SQ_{10}$ (4n-168) | $SW_{11}$ (4n-387) | $SW_{103}$ (4n-393) | $SP_{101}$ (4n-403) | $SQ_{11}$ (4n-387) |
|---|---|---|---|---|---|---|---|---|
| 42 | $W_0$ | $W_{-6}$ | $P_{-16}$ | $Q_0$ | $W_{-219}$ | $W_{-225}$ | $P_{-235}$ | $Q_{-219}$ |
| 43 | $W_4$ | $W_{-2}$ | $P_{-12}$ | $Q_4$ | $W_{-215}$ | $W_{-221}$ | $P_{-231}$ | $Q_{-215}$ |
| 44 | $W_8$ | $W_2$ | $P_{-8}$ | $Q_8$ | $W_{-211}$ | $W_{-217}$ | $P_{-227}$ | $Q_{-211}$ |
| 45 | $W_{12}$ | $W_6$ | $P_{-4}$ | $Q_{12}$ | $W_{-207}$ | $W_{-213}$ | $P_{-223}$ | $Q_{-207}$ |
| 46 | $W_{16}$ | $W_{10}$ | $P_0$ | $Q_{16}$ | $W_{-203}$ | $W_{-209}$ | $P_{-219}$ | $Q_{-203}$ |
| 47 | $W_{20}$ | $W_{14}$ | $P_4$ | $Q_{20}$ | $W_{-199}$ | $W_{-205}$ | $P_{-215}$ | $Q_{-199}$ |
| 48 | $W_{24}$ | $W_{18}$ | $P_8$ | $Q_{24}$ | $W_{-195}$ | $W_{-201}$ | $P_{-211}$ | $Q_{-195}$ |
| 49 | $W_{28}$ | $W_{22}$ | $P_{12}$ | $Q_{28}$ | $W_{-191}$ | $W_{-197}$ | $P_{-207}$ | $Q_{-191}$ |
| 50 | $W_{32}$ | $W_{26}$ | $P_{16}$ | $Q_{32}$ | $W_{-187}$ | $W_{-193}$ | $P_{-203}$ | $Q_{-187}$ |
| 51 | $W_{36}$ | $W_{30}$ | $P_{20}$ | $Q_{36}$ | $W_{-183}$ | $W_{-184}$ | $P_{-199}$ | $Q_{-183}$ |

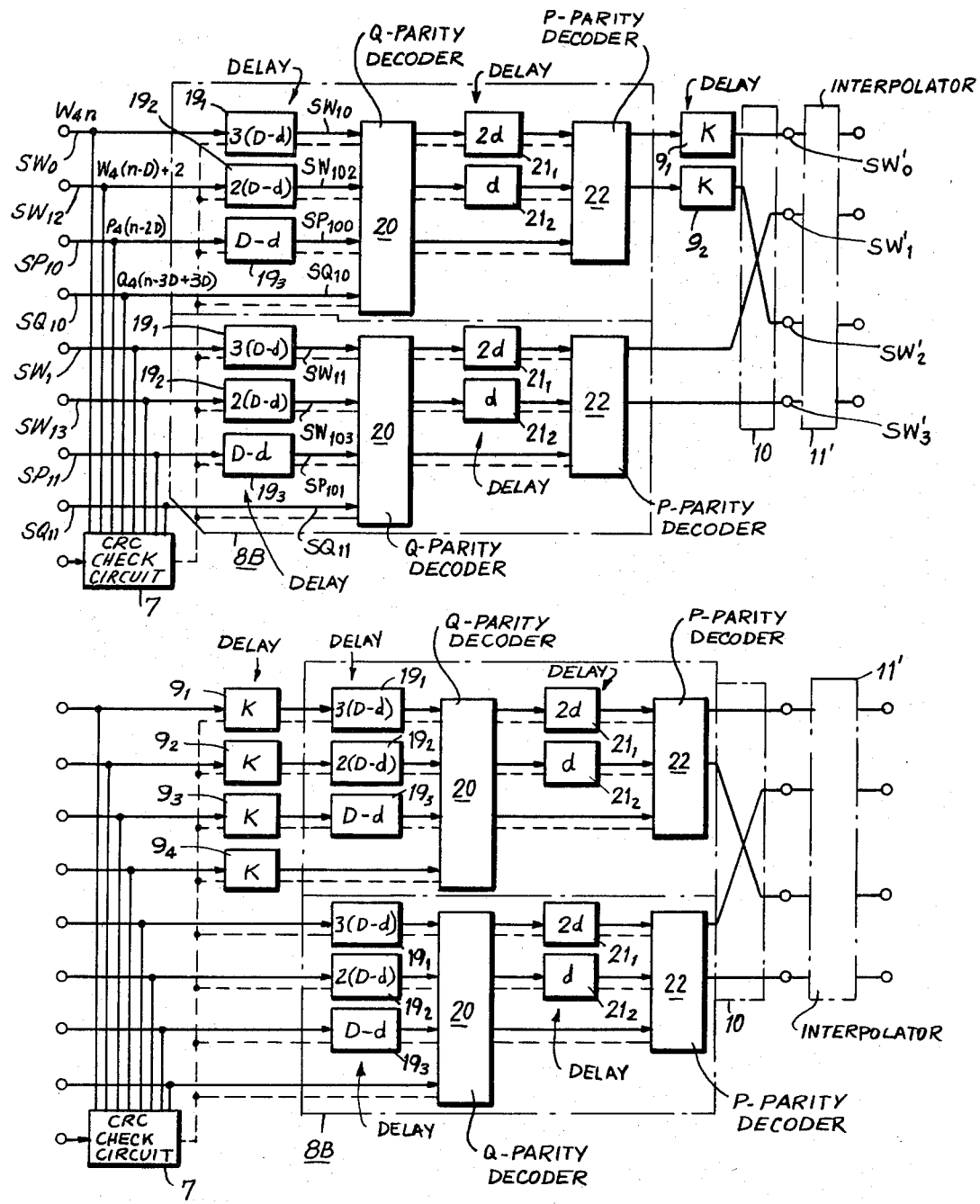

FIG.11A
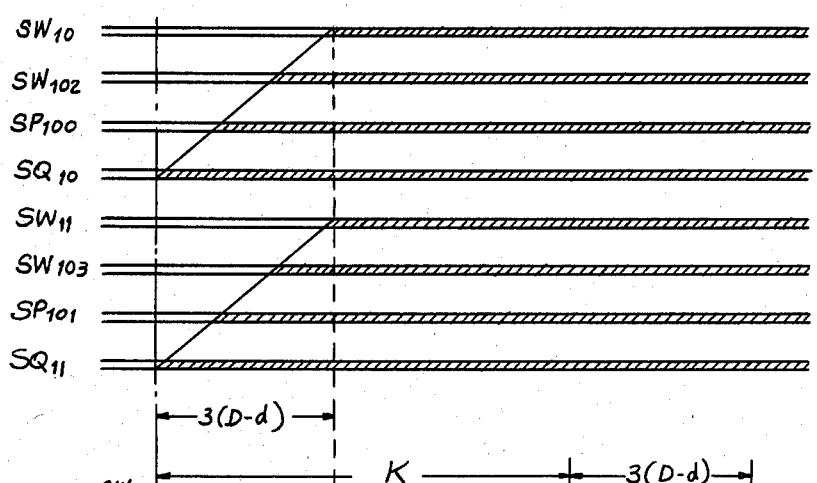
FIG.11B
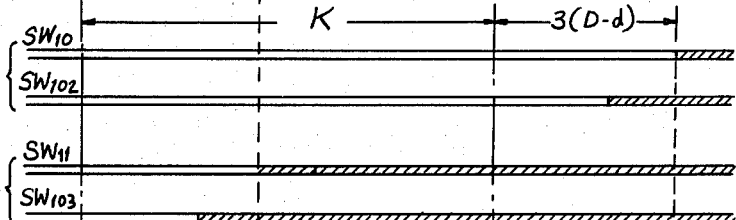
FIG.11C
FIG.11D
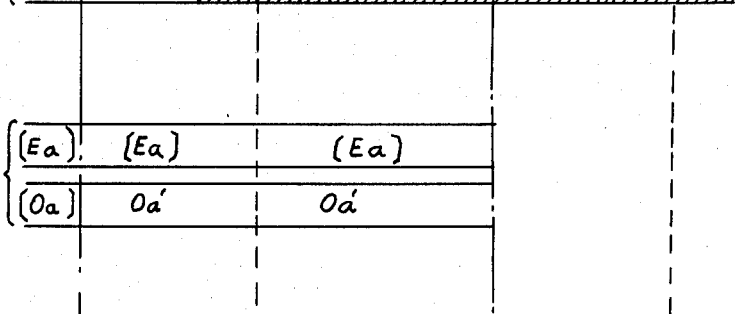
FIG.11E
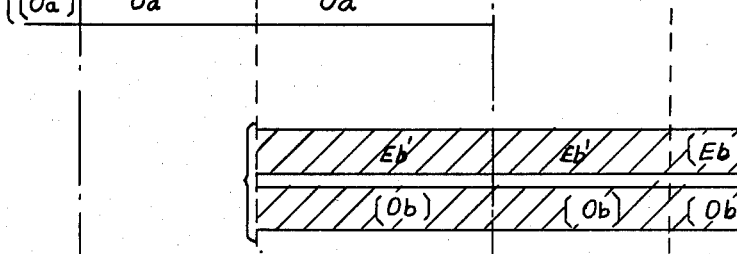

METHOD AND APPARATUS FOR COMMUNICATING DIGITAL INFORMATION WORDS BY ERROR-CORRECTION ENCODING

BACKGROUND OF THE INVENTION

1. Field of the Invention

This invention relates to a method and apparatus for communicating digital information words and, more particularly, to an encoding/decoding technique wherein plural information words are encoded in an error-correcting code having a high error correcting ability so as to recover the original information words after transmission, recording, and the like.

2. Related Documents

The following documents describe encoding techniques which are helpful in providing background information and understanding to the present invention:

U.S. Pat. No. 4,189,710

U.S. application Ser. No. 30,652, filed Apr. 16, 1979 and now U.S. Pat. No. 4,238,852

U.S. application Ser. No. 31,030, filed Apr. 18, 1979 and now abandoned

U.S. application Ser. No. 86,677, filed Oct. 19, 1979 and now U.S. Pat. No. 4,306,305

"Optimal Rectangular Code for High Density Magnetic Tapes" by Patel and Hong, IBM Journal of Research and Development, pages 579–588, November 1974.

3. Description of the Prior Art

There are many applications for the transmission and recording of digital data. In one application, an audio analog signal is converted into a digital signal, and the digital signal is recorded directly, such as by a rotary-head type video tape recorder (VTR) or by a fixed-head recorder having a high recording density. The digitized audio signal generally is represented by a pulse code modulated (PCM) signal, and the technique of recording such digitized audio signals either by rotary-head type VTR's or by fixed-head recorders is known as PCM recording.

Although PCM recorders offer the advantage of high accuracy such that an original audio signal can be faithfully reproduced, PCM recorders, and digital data transmission systems in general, suffer from the drawback that noise, interference, signal dropout, and the like may be present either in the transmission link, in the transmitter (recorder) or in the receiver (reproducer) so as to destroy individual PCM signals. Such loss of data may result in serious errors in the reproduced signal so as to interfere with, for example, the reproduced audio signal. In an effort to minimize this problem, error-correction codes have been proposed, whereby the PCM signals (or other data information words) are encoded in such error-correction codes to allow for the correction or compensation of erroneous words at the data receiver (or recorder). If the data words contain errors which exceed the correction ability of the error-correction code, then such errors are compensated by replacing those erroneous words with words that are approximated from the correct data words.

Typical error-correction encoding techniques often are not successful in recovering digital information which is edited on a recording medium. For example, if PCM signals are recorded in longitudinal tracks on a magnetic tape, editing may occur either by splicing two tapes (e.g. tape A and tape B) together or by electronic editing (e.g. by replacing original PCM signals with new PCM signals from an edit point onward). Generally, when the information which is recorded on the magnetic tape is reproduced therefrom, multiple errors occur within the vicinity of the edit point (either the spliced edit point or the electronic edit point) which may exceed the error correcting ability of the error-correction code in which the PCM signals are encoded. Such multiple errors are known as burst errors, wherein a "burst" of PCM signals on either side of the edit point are distorted or otherwise made erroneous. Such burst errors appear as a multiple of consecutive, erroneous data words during reproduction. To minimize the effect of such burst errors, an interleave technique has been proposed in which, for example, data words that are out-of-sequence from each other are assembled, or interleaved, so as to form a data block. This data block may be formed of, for example, words #1, #47, #68, #125, . . . and the like. Even if multiple words in such a data block are distorted by burst error, when these words are de-interleaved during reproduction, such burst errors are sufficiently dispersed so as to appear as random errors. Thus, data which may have constituted an original block and which was interleaved to form a data block for recording purposes is only partially lost when that data block is de-interleaved during reproduction. However, even if erroneous words are dispersed, sufficient numbers of such words may be erroneous so as to exceed the error correcting ability of the error-correction code, thereby making satisfactory error correction practically impossible.

Yet another technique which has been proposed for avoiding burst errors which may be due to, for example, an editing operation, is to record a single channel of data information in multiple tracks so as to lower the probability that all of the data words in a single data block will be simultaneously erroneous. For example, PCM signals and an error correcting (or detecting) code signal may constitute a single error-correcting code block, this block being distributed in parallel, multiple tracks for recording. One type of code may be the optimal rectangular code (ORC). Thus, an error-correcting code block may be recorded as multiple words, each word being recorded in a separate track, these words being in alignment across the tape. However, with this multi-track technique, it is possible that, in the vicinity of the edit point, that is, in the multi-error section, a relatively high number of words in the error-correcting code block may be erroneous, thereby defeating error correction and error compensation.

A still further proposal directed to the recovery of data in a multi-error section of magnetic tape is described in German Patent Document No. 2,916,973. In this proposal, the data words which are reproduced from the magnetic tape are written into a memory and then, subsequently, are read out from that memory. When data is reproduced from the multi-error section of the magnetic tape, such data is not stored in the memory. This is because, since such data is expected to contain a high number of erroneous words, the storage of such erroneous words is avoided. As a result, the information which had been recorded in the multi-error section of the magnetic tape is not reproduced. To minimize this loss of data, the correct words which are reproduced prior to the multi-error section and the correct data words which are reproduced following the multi-error section are, effectively, joined such that the reproduced signals effectively "skip over" the multi-error section. To assist this joining of correct data words, the speed at which the magnetic tape is driven is increased from its normal playback speed when the multi-error section is reached. However, such change in the tape speed requires a synchronous change in the frequence of the clock signals which are used to store and retrieve the correct data words, as well as those clock signals which are used to process the reproduced data. Suitable control over the clock signal generator and timing circuitry is quite complicated. Also, if a time code is recorded on the magnetic tape, this technique is quite difficult to implement when the time code is used as a basis for the clock signals.

Yet another error-correcting encoding technique which has been proposed for a stationary-head PCM recorder is the so-called double recording technique. In double recording, each data word is represented as a main word and an identical sub-word. The main and sub-words are recorded in parallel tracks. In one modification of the double recording technique, the identical main and sub-words are time displaced with respect to each other so as to shift their respective recording positions. Thus, main data word #1 may be recorded in alignment with sub-word #55. Alternatively, the time-displaced main and sub-words may be interleaved and recorded in a common track. When these double recorded words are reproduced, if a main data word is detected as being erroneous, it is replaced by its corresponding sub-word. It is expected that, by time-displacing the main and sub-words, multiple errors which may occur in the multi-error section of the recording tape that might affect the main data word sequence would not affect its corresponding sub-word sequence. Thus, in the multi-error section, erroneous main data words are replaced by correct sub-words, the latter being recorded in a region that is sufficiently removed from the multi-error section. However, the implementation of this double recording technique is accompanied by high redundancy, primarily because each data word must be recorded in duplicate, and also requires relatively complicated apparatus. Furthermore, the main and sub-words generally do not undergo independent error-correction encoding and, therefore, the error correction ability of the double recording technique is reduced, especially in the vicinity of the edit point. Still further, if an erroneous main data word which is reproduced from the multi-error section is replaced by its corresponding sub-word, and if that sub-word is subjected to noise, drop-out, or the like, error correction and compensation is not possible.

OBJECTS OF THE INVENTION

Therefore, it is an object of the present invention to provide a method and apparatus for transmitting or recording digital data information which overcomes the aforenoted defects and disadvantages of the prior art.

Another object of this invention is to provide an improved error-correction and error compensation technique for the transmission or recording of digital data.

Another object of this invention is to provide a method and apparatus for encoding and decoding PCM signals in an error-correction code which is particularly useful in a PCM recorder.

A further object of this invention is to provide an error-correction encoding technique which, when used in a PCM recorder, allows improved error correction and error compensation even in a multi-error section in the vicinity of an edit point of the record medium.

An additional object of this invention is to provide an improved error-correction encoding technique which, when used in a PCM recorder, substantially avoids the loss of data in the vicinity of an edit point on the record medium.

A still further object of this invention is to provide an improved method and apparatus for encoding and decoding digital data in an error-correction code having minimal redundancy and relatively simple apparatus to carry out that method.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for communicating a sequence of digital information words, for transmission or for recording. The information words are separated into sequences of odd and even information words. The separated odd and even information words are time-displaced from each other by a predetermined amount. The odd information words are encoded in an error-correcting code, and the even information words are separately encoded in a similar error-correcting code. The encoded time-displaced odd and even information words are combined into a transmission block, and this transmission block is transmitted or recorded. In one embodiment, each of the odd and even sequences of information words are used to generate respective odd and even error-correcting words which are interleaved into the odd and even sequences, respectively. For reception, or playback, each transmission block is received, and the odd and even information words are decoded from the respective sequences thereof so as to correct errors therein. The time displacement between the decoded odd and even information words are removed. If an odd or even information word contains an uncorrected error therein, a correct odd or even information word is approximated by interpolating adjacent, decoded even and odd information words, respectively, and the approximated, correct information word is used to replace the uncorrected word. Then, the corrected sequence of information words, formed of the decoded and approximated information words, is recovered.

BRIEF DESCRIPTION OF THE DRAWINGS

The following detailed description, given by way of example, will best be understood in conjunction with the accompanying drawings in which:

FIG. 1 is a block diagram of one embodiment of the present invention which can be used in, for example, a PCM recorder;

FIG. 2 is a block diagram of another embodiment of the present invention which is adapted to reproduce the data that is encoded by the apparatus shown in FIG. 1;

FIGS. 3A–3E are timing diagrams which are useful in understanding the operation of the present invention in the vicinity of an edit point on the record medium;

FIG. 6 is a chart which is useful in understanding the encoding technique of the present invention;

FIG. 7 is a diagrammatic representation of a transmission block which is produced by the encoder of the present invention;

FIG. 8 is a block diagram of one embodiment of a decoder which may be used in the embodiment of FIG. 2;

FIG. 9 is a block diagram showing a modification of the encoder of FIG. 8;

FIG. 10 is a diagrammatic representation which is useful in understanding the operation of the present invention;

FIGS. 11A–11E are timing diagrams which are useful in understanding the operation of another embodiment of the present invention in the vicinity of an edit point on the record medium;

DETAILED DESCRIPTION OF CERTAIN PREFERRED EMBODIMENTS

Figure 4:
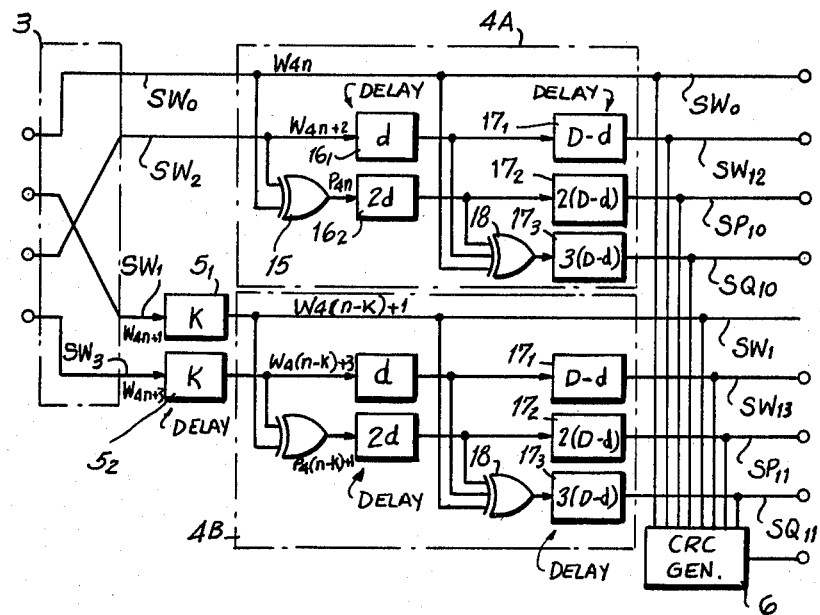
FIG. 4 is a partial block, partial logic diagram of one type of encoder which may be used in the embodiment in FIG. 1.

Referring now to the drawings, wherein like reference numerals are used throughout, FIG. 1 is a block diagram illustrating one embodiment of apparatus whereby a sequence of digital information words, such as words which are provided serially-by-word, is encoded in a manner which is designed to minimize loss of information due to errors in transmission, recording, reproducing and the like. A preferred application of the apparatus illustrated in FIG. 1 is to supply suitably processed digital information words to a stationary-head PCM recorder. For the purpose of the present discussion, it will be assumed that the processed information words are recorded. However, it should be readily appreciated that, if desired, the apparatus to be described can be used to transmit data words from one location to another.

The apparatus illustrated in FIG. 1 is comprised of a 1-to-2N channel converter 2, an even/odd distributing circuit 3, a delay circuit 5, error correcting encoders 4A and 4B and an error detecting code generator 6. 1-to-2N channel converter 2 is provided with an input terminal 1 adapted to receive the sequence of digital information words which, for example, may be supplied thereto serially-by-word. If each information word is an 8-bit PCM signal, then each 8-bit word may be supplied either serially-by-bit or parallel-by-bit. If each PCM signal is supplied as a parallel-bit word, then input terminal 1 may, in actuality, be comprised of eight separate input terminals, each adapted to receive a respective bit of the PCM signal. 1-to-2N channel converter 2 is adapted to convert a single channel of received PCM signals into 2N parallel channels. For example, if 2N sequential information words are received, converter 2 may include 2N shift registers, each being adapted to receive and temporarily store a respective one of these 2N information words; and when the last shift register is loaded, these stored 2N information words appear in parallel at the output of the converter. Thus, 1-to-2N channel converter 2 may include 2N output terminals, each output terminal providing a respective one of the 2N information words. These 2N information words are provided at the output of the converter parallel-by-word. Each word may appear serially-by-bit or, if desired, each output terminal may, in fact, be comprised of eight parallel output terminals such that each of the 2N information words is provided at the output of converter 2 parallel-by-bit.

The 2N parallel information words produced at the output of 1-to-2N channel converter 2 appears as, for example, information words $W_1$, $W_2$, $W_3$, ... $W_{2N}$. These information words are supplied to even/odd distributing circuit 3 whereat the odd information words are separated from the even information words. As one example thereof, distributing circuit 3 may include two sets of conductors, one set being connected to receive all of the odd information words produced at the outputs of converter 2, and the other set being connected to receive all of the even information words produced at the outputs of the converter. Even/odd distributing circuit 3 includes an upper group of N output terminals whereat all of the even information words are provided and a lower group of N output terminals whereat all of the odd information words are provided. Thus, if, for example, eight PCM signals are supplied sequentially to 1-to-2N channel converter 2, the four even information words, such as $W_2$, $W_4$, $W_6$ and $W_8$, are provided at the upper group of N output terminals of distributing circuits 3, and concurrently the four odd information words, such as $W_1$, $W_3$, $W_5$ and $W_7$, are provided at the lower group of N output terminals. The odd information words are delayed by delay circuit 5 by a time delay which is represented herein as K. It will become apparent that this time delay K is in units of time required to transmit one complete transmission block. Thus, the delay K is equal to the time required to transmit K transmission blocks.

The N even information words provided at the upper group of N output terminals of even/odd distributing circuit 3 are supplied to error correcting encoder 4A whereat they are encoded in a suitable error-correction code which may be selected from those error-correction codes which are known to individuals of ordinary skill in the art. The delayed odd information words produced at the output of delay circuit 5 are supplied to error correcting encoder 4B whereat they are encoded in a similar error-correction code. As one example thereof, each error correcting encoder may be a so-called parity encoder wherein one or more parity words are produced for each group of information words supplied thereto. If the N even information words are considered to be an even sub-block, and if the N odd information words are considered to be an odd sub-block, then error correcting encoder 4A may generate one or more even parity words in response to the even sub-block of information words, and error correcting encoder 4B may generate one or more odd parity words in response to the odd sub-block of information words. If it is assumed that each encoder generates M error correcting words, then the output of each encoder is comprised N+M data words, these data words including N even or odd information words and M error correcting words. All of these data words, that is, 2(N+M) data words, are supplied to error detecting code generator 6 which functions to generate an error detecting code word, such as a CRC word. Error detecting code generators are known to those of ordinary skill in the art, and the use of error detecting code words to detect the presence of one or more errors in a block of data words also is well known. All of the data words, including the error detecting code word which also is referred to herein as a data word, are assembled into a transmission block which, for example, is constituted by the even sub-block formed of (N+M) data words plus the odd sub-block formed of (N+M) data words, plus the error detecting word plus a synchronizing word. Preferably, this transmission block is transmitted, or recorded, such as by a PCM recorder, serially-by-word. Each bit in each data word may be recorded serially or, alternatively, all of the bits which comprise a data word may be transmitted or recorded in parallel. Thus, the transmission block is transmitted, or recorded, serially-by-word, and each word may be presented either parallel-by-bit or serially-by-bit, as desired. Still further, each transmission block, that is, each data word in each transmission block, may be suitably modulated in conventional manner to facilitate transmission or recording. For example, each word may be modulated in the so-called 3-position modulation format (which is described in "A New Look-Ahead Code for Increased Data Density" by George V. Jacoby, IEEE Transactions, Volume 13, No. 5, September 1977, pages 1202–1024). Alternatively, the transmission blocks may be modulated in a modified frequency modulation format or other conventional format, as may be desired. The modulated transmission block, which now appears as a single channel (although not shown in FIG. 1) may be recorded in a single track on, for example, magnetic tape, or other record medium, by a stationary head PCM recorder.

The transmission blocks which are transmitted or recorded by the apparatus shown in FIG. 1 are recovered by the apparatus shown in FIG. 2, and the original sequence of digital information words is reproduced. The apparatus in FIG. 2 may be included in a digital data receiver, a PCM reproducing device, or the like, and includes an error detecting word decoder 7, error correcting decoders 8A and 8B, a delay circuit 9, an even/odd assembler 10, an error compensating circuit 11 and a 2N-to-1 channel converter 12. If the apparatus shown in FIG. 2 is used with a PCM reproducing device, it is appreciated that the serially recorded PCM signals, that is, the transmission block which is recorded serially-by-word in, for example, a single track on a record medium, is reproduced from that record medium and the serially reproduced words are converted to parallel words. For example, the reproducing circuitry may include 2(N+M)+1 shift registers which receive the serially reproduced data words of the transmission block and temporarily store such words, whereby (N+M) even words are produced at the (N+M) outputs of one set of shift registers, (N+M) odd words are produced at the (N+M) outputs of another set of shift registers, and the error detecting word is produced at the output of the remaining shift register. Thus, all of the data words which constitute the originally transmitted, or recorded, transmission block are reproduced as parallel words and are supplied to the apparatus illustrated in FIG. 2.

As may be appreciated, one or more of the data words included in the received, or reproduced, transmission block may be erroneous. Errors may arise either in the transmission/recording section, in the communication channel, or record medium, or in the receiving/reproducing section. In any event, such errors, if not corrected or otherwise compensated may result in loss of information or distortion of the original data. For example, if the illustrated apparatus is used in a PCM recording/reproducing system, then errors which are not corrected or otherwise compensated may cause undesired interference or distortion of the analog audio signal which ultimately is reproduced. Error detecting word decoder 7 is supplied with the error detecting code word as well as all of the odd and even data words to detect errors in such words in the received transmission block. Thus, and as is shown, the N even information words together with the M even error correcting words are supplied to the error detecting word decoder; and the N odd information words together with the M odd error correcting words also are supplied to this decoder. It is appreciated that error detecting word decoder 7 is compatible with error detecting code generator 6. Thus, if the error detecting code word is a CRC word, then error detecting word decoder 7 utilizes this CRC word to detect the presence of one or more errors in the transmission block. If one or more information words or one or more error correcting words is erroneous, the error detecting word decoder detects an error condition and, as indicated by the broken lines in FIG. 2, produces a "pointer" or error flag signal which is associated with each data word. This error flag signal indicates the presence of an error in the transmission block and represents that the data word with which it is associated may be the cause of the error condition. It is appreciated that, even if a particular data word is not erroneous, an error flag signal will be associated with it.

The (N+M) data words included within the even sub-block, together with their associated error flag signals, are supplied to error correcting decoder 8A; and the (N+M) odd data words included within the odd sub-block, together with their associated error flag signals, are supplied to error correcting decoder 8B. Each decoder utilizes the information and error-correction words supplied thereto to carry out an error correction operation in the event that the error flag signals are present. Such error correction operations are known to those of ordinary skill in the art and, of course, are dependent upon the particular error correcting code which is utilized. For example, if a sub-block, such as the even or odd sub-block, includes M parity words, then the error correcting decoder may be a parity decoder which uses the parity words to correct the erroneous information words. Error correcting decoders 8A and 8B thus produce correct information words and, more particularly, error correcting decoder 8A produces N correct even information words and error correcting decoder 8B produces N correct odd information words.

The corrected even information words are supplied to delay circuit 9 whereat they are delayed by K time units. It is appreciated that the even information words are delayed by the same amount K as was used to delay the odd information words in the encoding apparatus of FIG. 1. Hence, the time-displacement which had been imparted in the encoder now is removed. Consequently, the delayed even information words produced at the output of delay circuit 9 are in time alignment with the odd information words produced at the output or error correcting decoder 8B. The time-aligned odd and even information words are supplied to even/odd assembler 10 whereat they are interdigitated. For example, if delay circuit 9 supplies even information words $W_0$, $W_2$, $W_4$ and $W_6$ to the even/odd assembler, and if error correcting decoder 8B supplies odd information words $W_1$, $W_3$, $W_5$ and $W_7$ to the assembler, then these information words are interdigitated such that, at consecutive outputs of assembler 10, sequential information words $W_0$, $W_1$, $W_2$ ... $W_6$ and $W_7$ are produced.

It is possible that a number of transmission blocks which are received, or reproduced, by the apparatus illustrated in FIG. 2 contain multiple errors such that the error correcting ability of decoders 8A and 8B is exceeded. In that event, some of the information words which are produced at the outputs of even/odd assembler 10 remain uncorrected. Nevertheless, in view of the delay K imparted by delay circuit 5, it is expected that, even if a burst error is present, adjacent odd and even information words both will not be erroneous. That is, if even information words $W_2$ and $W_4$ are erroneous, it is expected that none of odd information words $W_1$, $W_3$ and $W_5$ will be erroneous. Also, it is expected that an odd information word and an adjacent even information word both will not be erroneous. Hence, those isolated even or odd information words which may be present at the outputs of even/odd assembler 10 can be corrected. All of the information words, that is, information words $W_0$, $W_1$, ... $W_6$, $W_7$ are supplied to error compensating circuit 11. The error compensating circuit functions to compensate an information word which remains uncorrected. Such an information word is identified by its associated error flag signal which remains present. That is, if the error flag signals which are associated with those information words that have been corrected are reset, then it is concluded that those information words which are associated with error flag signals that remain set are uncorrected. Preferably, error compensating circuit 11 includes interpolating circuits which function to approximate a correct odd or even information word by interpolating adjacent even or odd information words, respectively. For example, let it be assumed that odd information word $W_3$ remains uncorrected, as indicated by its associated error flag signal. An approximation of correct information word $W_3$ is produced by error compensating circuit 11 by interpolating adjacent even information words $W_2$ and $W_4$. That is, an average, or mean value of these adjacent even information words is obtained and used as an approximation of information word $W_3$. Likewise, if information word $W_6$ remains uncorrected, then an approximation thereof is derived by obtaining the average, or mean value of adjacent odd information words $W_5$ and $W_6$. It is appreciated that, if each information word is a PCM signal representing a corresponding analog level, and if the analog level corresponds to an audio signal, then, since the audio signal level varies relatively slowly, a good approximation of a sampled level can be obtained by interpolating, or averaging, the sample levels on either side of the erroneous level. This compensated sampled will not be perceived when the original audio signal is reproduced. If desired, a higher order interpolation technique may be used to approximate a correct information word.

The corrected and compensated information words produced by error compensating circuit 11 are supplied to 2N-to-1 channel converter 12 whereat the information words, which are supplied parallel-by-word, are converted back to a single channel of serial information words. These serially recovered information words are provided at output terminal 13 and they are substantially the same as the original information words which had been supplied to input terminal 1 in the encoding apparatus shown in FIG. 1. Of course, the serially supplied information words may be produced either as serial-bit words or as parallel-bit words. If the illustrated apparatus is used in a PCM recorder, then the PCM signals produced at output terminal 13 are converted back to analog signals to recover the original audio information. Thus, audio signals which are recorded in PCM form are recovered and reproduced.

In the foregoing discussion, it has been assumed that the transmission of error-correction encoded PCM signals are recorded in a single track on a suitable record medium. If desired, each transmission block may be recorded in plural tracks. Furthermore, multiple channels of PCM signals may be encoded simultaneously, as by providing multiple encoders, and multiple transmission blocks may be recorded simultaneously in multiple tracks.

Let it be assumed that the digital data words which are encoded by the apparatus shown in FIG. 1 are PCM signals and that such PCM signals are recorded on a magnetic tape 14A. Let it further be assumed that other PCM signals, derived from a different source, are recorded on a magnetic tape 14B. If the information on these tapes are to be edited such that the information on tape 14B is to follow the information on tape 14A, such as by splicing these two tapes at a splice point $P_s$, as shown in FIG. 3A, then, when the information recorded on the spliced tapes is reproduced, the even and odd information words appear as shown in FIG. 3B. For ease in understanding, FIG. 3B shows the even information words $E_a$ and $E_b$ and the odd information words $O_a$ and $O_b$ recorded in separate tracks on tapes 14A and 14B. It will be appreciated that the odd and even information words are recorded in a single track in successive, serially-by-word transmission blocks. Splice point $P_s$ arrives at the stationary PCM playback head at time $T_s$. It is seen, from FIG. 3B, that at times prior to time $T_s$, which corresponds to the edit point, even and odd information words are reproduced from tape 14A. At times following edit point $T_s$, even and odd information words are reproduced from track 14B. However, by reason of delay circuit 9, it is recognized that, when odd information words $O_b$ are reproduced from tape 14B, the even information words which then are in time-alignment therewith are those delayed even information words $E_a$ which have been reproduced from tape 14A and are delayed by K time units.

If a corrected (or correct) information word reproduced either from tape 14A or tape 14B is represented by brackets [], then, since the reproduced odd information words are not subjected to a delay in the decoding apparatus shown in FIG. 2, prior to edit point $T_s$ the reproduced odd information words are shown as $[O_a]$, and following edit point $T_s$ the odd information words are shown as $[O_b]$, these odd information words being supplied to error compensating circuit 11. By reason of delay circuit 9, corrected (or correct) even information words $[E_a]$ are derived from tape 14A up until delayed edit point $T_{sk}$ is reached, this delayed edit point being delayed from edit point $T_s$ by K time units, as shown in FIG. 3C. Following this delayed edit point $T_{sk}$, even information words $[E_b]$ reproduced from tape 14B are produced. Thus, during the interval from edit point $T_s$ to delayed edit point $T_{sk}$, information derived from both magnetic tapes 14A and 14B coexist. That is, during this interval, even information words $[E_a]$ reproduced from tape 14A coexists with odd information words [$O_b$] reproduced from tape 14B. Of course, these information words are derived from different sources and coexist by reason of delay circuit 9.

As is appreciated, multiple errors exist at edit point $T_s$ and, similarly, multiple errors exist at delayed edit point $T_{sk}$. Furthermore, in the vicinity of the edit and delayed edit points, multiple errors may be expected. Such multi-error sections are defined by the ranges ($T_s-\alpha$) to ($T_s+\alpha$), and ($T_{sk}-\alpha$) to ($T_{sk}+\alpha$). In these multi-error sections, or ranges, it is expected that the occurrences of errors in the reproduced odd and even information words will exceed the error correcting ability of the error correcting decoders 8A and 8B. More particularly, uncorrected odd information words are expected in the multi-error section surrounding edit point $T_s$; and uncorrected even information words are expected in the multi-error section surrounding delayed edit point $T_{sk}$. However, correct even information words [$E_a$] are supplied through error compensating circuit 11 in the multi-error section surrounding edit point $T_s$, and correct odd information words [$O_b$] are supplied to the error compensating circuit in the multi-error section surrounding delayed edit point $T_{sk}$.

Delay K is selected such that the respective multi-error sections do not overlap. That is, the multi-error section surrounding edit point $T_s$ does not overlap any portion of the multi-error section surrounding delayed edit point $T_{sk}$. Furthermore, the length $2\alpha$ of each multi-error section is a function of the extent of the expected error and the error-correcting ability of the error-correction code which is used.

As shown in FIG. 3D, correct even information words [$E_a$] reproduced from tape 14A are supplied to error compensating circuit 11 up until point ($T_{sk}-\alpha$) is reached. From the interval ($T_s-\alpha$) to ($T_{sk}-\alpha$), correct odd information words cannot be derived from tape 14A. Hence, error compensating circuit 11 compensates for such uncorrected odd information words by interpolating adjacent even information words [$E_a$] to produce approximate correct odd information words $O'_a$. That is, up until point ($T_s-\alpha$) is reached, correct even and odd information words [$E_a$] and [$O_a$] can be produced by the decoding apparatus illustrated in FIG. 2. From point ($T_s-\alpha$) to point ($T_{sk}-\alpha$), correct even information words [$E_a$] may be reproduced from tape 14A, but compensated, or approximated odd information words $O'_a$ must be produced.

Similarly, from point ($T_s+\alpha$) onward, correct odd information words [$O_b$] can be reproduced from tape 14B and supplied to error compensating circuit 11 by the decoding apparatus shown in FIG. 2. However, from point ($T_s+\alpha$) to point ($T_{sk}+\alpha$), uncorrected even information words are derived from tape 14B. Accordingly, error compensating circuit 11 produces approximate correct even information words by interpolating adjacent odd information words [$O_b$]. These approximated, or compensated even information words are shown in FIG. 3E as $E'_b$. From point ($T_{sk}+\alpha$) onward, that is, after the conclusion of the delayed multi-error section, correct even and odd information words [$E_b$] and [$O_b$] can be reproduced from tape 14B. Of course, from FIG. 3C, it is appreciated that, from edit point $T_s$ onward, odd information words no longer are reproduced from tape 14A. Likewise, from delayed edit point $T_{sk}$ onward, even information words derived from tape 14A no longer are supplied to error compensating circuit 11. From point ($T_s+\alpha$) to ($T_{sk}-\alpha$), error-corrected even information words [$E_a$] reproduced from tape 14A and error-corrected odd information words [$O_b$] reproduced from tape 14B coexist. Also, in this region, approximated, or interpolated odd information words $O'_a$ derived from tape 14A as well as approximated, or interpolated even information words $E'_b$, derived from tape 14B coexist. In this region where data from both tapes coexists, it is advantageous to blend, or gradually mix the data derived from tape 14A with the data derived from tape 14B. More particularly, it is advantageous to gradually decrease, or attenuate, the data derived from tape 14A while, concurrently, gradually increase the data derived from tape 14B. This operation is known as cross-fading, and suitable cross-fading circuitry may be coupled to output terminal 13 (FIG. 2) so as to gradually change over the reproduced PCM signals from tape 14A to tape 14B in the region ($T_s+\alpha$) to ($T_{sk}-\alpha$). This cross-fading operation minimizes discontinuities in the signals which otherwise might be present at edit point $T_s$. Consequently, the cross-fading operation results in an audio signal having substantially imperceptible interference or discontinuities caused by the editing of tapes 14A and 14B.

Referring now to FIG. 4, there is illustrated one embodiment of error correcting encoders 4A and 4B which may be used in the apparatus shown in FIG. 1. FIG. 4 also shows an embodiment of even/odd distributing circuit 3 which, as illustrated, may be comprised of suitably grouped conductors so as to couple the even information words $SW_0$ and $SW_2$ to the upper group of outputs of the distributing circuit and to couple the odd information words $SW_1$ and $SW_3$ to the lower group of outputs. As one example, it is assumed that each transmission block is formed of four information words. Of course, if desired, any number 2N of information words may be combined with M error correcting words in a transmission block.

If the number of each transmission block is represented as n (n=1, 2, 3, ...), then a sequence of even information words $W_{4n}$ represents the even information words $SW_0$, a sequence of information words $W_{4n+2}$ represents the even information words $SW_2$, a sequence of odd information words $W_{4n+1}$ represents the odd information words $SW_1$, and a sequence of odd information words $W_{4n+3}$ represents the odd information words $SW_3$. Thus, for block #0 (n=0), $SW_0$ is represented by the even information word $W_0$, $SW_2$ is represented by the even information word $W_2$, $SW_1$ is represented by the odd information word $W_1$ and $SW_3$ is represented by the odd information word $W_3$. The odd information words $SW_1$ and $SW_3$ are delayed by delay circuits $5_1$ and $5_2$, respectively, each providing a delay of K time units. The undelayed even information words are supplied to error correcting encoder 4A, and the delayed odd information words are supplied to error correcting encoder 4B.

As shown in FIG. 4, both error correcting encoders are of substantially the same construction; and the same reference numerals are used to identify corresponding components of each. A parity word generator 15, shown as an exclusive-OR circuit, is supplied with successive bits of the information words $SW_0$ and $SW_2$ to produce a parity word therefrom. This parity word is represented as a P-parity word, and parity word generator 15 generates a sequence P-parity words $P_{4n}$ in response to the even information words, and an odd P-parity word, represented by the sequence $P_{4n+1}$ is generated in response to the odd information words. The even information words $W_{4n}$ and $W_{4n+2}$, together with the even P-parity word $P_{4n}$ comprise a P sub-block. Likewise, the odd information words $W_{4n+1}$ and $W_{4n+3}$, together with the odd P-parity word $P_{4n+1}$, comprise an odd P sub-block. The respective data words, that is, the information and parity words, of each P sub-block are interleaved by delay circuits $16_1$ and $16_2$. That is, even information word $W_{4n}$ is not delayed, even information word $W_{4n+2}$ is delayed by d time units in delay circuit $16_1$, and P-parity word $P_{4n}$ is delayed by 2d time units in delay circuit $16_2$. Similarly, in the odd error correcting encoder 4B, odd information word $W_{4n+1}$ is not delayed, odd information word $W_{4n+3}$ is delayed by d time units in delay circuit $16_1$, and P-parity word $P_{4n+1}$ is delayed by 2d time units in delay circuit $16_2$. Thus, the data words in each P sub-block are selectively delayed so as to form an interleaved P sub-block. More particularly, the even interleaved P sub-block is comprised of even information words $W_{4n}$ and $W_{4(n-d)+2}$, together with P-parity word $P_{4(n-2d)}$. Likewise, the odd interleaved P sub-block is comprised of information words $W_{4n+1}$ and $W_{4(n-d)+3}$, together with P-parity word $P_{4(n-2d)+1}$.

Each interleaved P sub-block is further encoded, and another parity word is generated in response to each data word that comprises the interleaved P sub-block. More particularly, in error correcting encoder 4A, another parity word generator 18, diagrammatically represented as an exclusive-OR circuit, receives the interleaved data words included in the even P sub-block to produce a Q-parity word in response thereto. This Q-parity word is represented as $Q_{4n}$. Likewise, in error correcting encoder 4D, a Q-parity word generator 18 generates a Q-parity word $Q_{4n+1}$ in response to the interleaved data words included in the odd P sub-block. The interleaved words of the even P sub-block, together with the even Q-parity word generated in response thereto, comprises an even Q sub-block, the words of this Q sub-block being interleaved by selectively delaying each word. Likewise, the words of the odd interleaved P sub-block, together with the Q-parity word generated in response thereto, comprise an odd Q sub-block. The words of the odd Q sub-block are interleaved by selectively delaying such words. More particularly, in the even Q sub-block, even information word $W_{4n}$ is not delayed. Even information word $W_{4(n-d)+2}$ is delayed by (D−d) time units in delay circuit $17_1$, thus providing the even information word $W_{4(n-D)+2}$. P-parity word $P_{4(n-2d)}$ is delayed by 2(D−d) time units in delay circuit $17_2$, thus providing the delayed P-parity word $P_{4(n-2D)}$. Finally, the Q-parity word $Q_{4n}$ is delayed by 3(D−d) time units in delay circuit $17_3$ to provide the delayed Q-parity word $Q_{4(n-3D+3d)}$. These selectively delayed words of the even Q sub-block thus are interleaved, resulting in an even interleaved Q sub-block comprised of even word sequences $SW_0$ and $SW_{12}$, even P-parity word sequence $SP_{10}$ and even Q-parity word sequence $SQ_{10}$.

It is appreciated that, in error correcting encoder 4B, the words included in the odd Q sub-block are selectively delayed by delay circuits $17_1$, $17_2$ and $17_3$ so as to form an odd interleaved Q sub-block. More particularly, the odd interleaved Q sub-block is comprised of odd information word sequences $SW_1$ and $SW_{13}$, represented as odd information words $W_{4(n-K)+1}$ and $W_{4(n-D-K)+3}$, respectively, the P-parity word sequence $SP_{11}$, represented as $P_{4(n-2D-K)+1}$, and the Q-parity word sequence $SQ_{11}$, represented as $Q_{4(n-3D+3d-K)+1}$.

In the foregoing expressions, $K > D > d$. Also, $K > 3(D-d)$.

Each even interleaved Q sub-block is comprised of two even information words, included in the sequences $SW_0$ and $SW_{12}$ and two parity words, a P-parity word included in the sequence $SP_{10}$ and a Q-parity word included in the sequence $SQ_{10}$. Similarly, each odd interleaved Q sub-block includes two odd information words, included in the sequences $SW_1$ and $SW_{13}$, and two parity words formed of the P-parity word included in the sequence $SP_{11}$ and the Q-parity word included in the sequences $SQ_{11}$. The respective data words in each Q sub-block are seen to be interleaved, that is, they are derived from time-displaced words. The even and odd interleaved Q sub-blocks are supplied to error detecting code generator 6, shown in FIG. 4 as a CRC word generator. Thus, the interleaved information and error-correction (e.g. parity) words, are used to form a cyclic redundancy check code word. This CRC word, together with the interleaved words which constitute the odd and even Q sub-blocks are combined with a synchronizing word (not shown) to form one transmission block. As mentioned above, this transmission block preferably is transmitted, serially-by-word, and may be further modulated and then supplied to a stationary PCM recording head. Each word may be recorded either serially-by-bit or parallel-by-bit, as desired.

Figure 5:
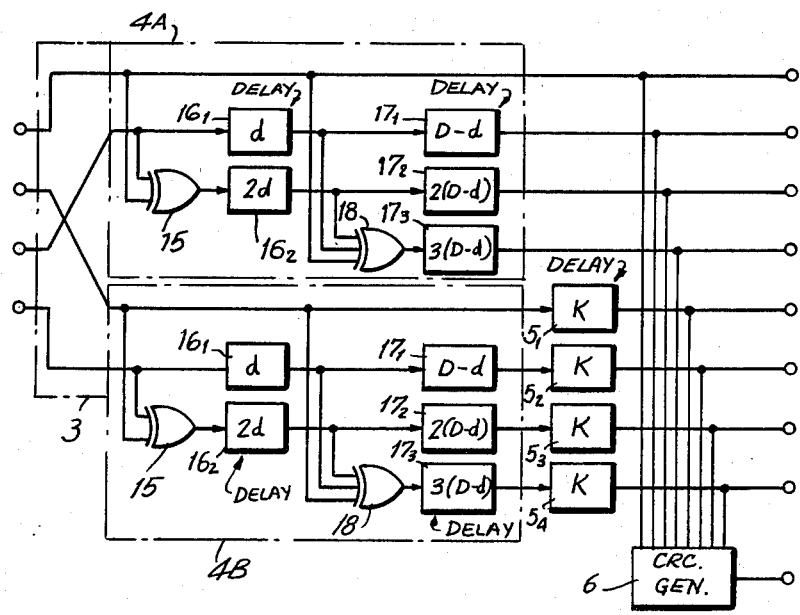
FIG. 5 is a partial block, partial logic diagram of a modification of the encoder shown in FIG. 4.

Another embodiment which may be used in place of the embodiment shown in FIG. 4 is illustrated in FIG. 5. The FIG. 5 arrangement is substantially similar to that shown in FIG. 4, except that the delay circuits which are utilized to impart a delay of K time units to the odd interleaved Q sub-block are connected to the output of error correcting encoder 4B rather than to the input thereof. Thus, delay circuit $5_1$ delays the odd information words included in sequence $SW_1$, delay circuit $5_2$ delays the odd information words included in sequence $SW_{13}$, delay circuit $5_3$ delays the P-parity words included in sequence $SP_{11}$ and delay circuit $5_4$ delays the Q-parity words included in sequence $SQ_{11}$. Nevertheless, the even and odd interleaved Q sub-blocks produced by the embodiments shown in FIGS. 4 and 5 are substantially identical. In both embodiments, the even information words are interleaved with even P-parity and Q-parity words, and the odd information words are interleaved with the odd P-parity and Q-parity words, all of the odd words being delayed by K time units with respect to the even words which comprise a single transmission block.

In the embodiments of FIGS. 4 and 5, error detecting code generator 6 is illustrated as a CRC code word generator. It may be appreciated that the cyclic redundancy check code merely is one type of error detection code which can be used with the present invention. In the CRC code, the eight data words which are included in a single transmission block are expressed as a polynomial over GE(2), which is a Galois field, this polynomial being divided by a determined generation polynomial to obtain a remainder which is added to the transmission block as the CRC code word. When this transmission block is received, or reproduced from a record medium, a polynomial is formed of the reproduced data and CRC words, and this polynomial is divided by the same generation polynomial which was used in the CRC generator. If no remainder is obtained by this division, then it is concluded that the transmission block does not contain any error. However, if a remainder is produced, then the transmission block contains at least one error. Usually, in a CRC decoder, if an error is detected in the transmission block, an error flag associated with each data word is set. If desired, the technique described in copending application Ser. No. 31,030, filed Apr. 18, 1979, wherein the particular erroneous data words are indicated, may be adopted.

If it is assumed that $K=55$, $D=16$ and $d=2$, then, for each transmission block #n ($n=-1, 0, 1, \ldots 55$), the data words $SW_0$, $SW_{12}$, $SP_{10}$, $SQ_{10}$, $SW_1$, $SW_{13}$, $SP_{11}$ and $SQ_{11}$ which are produced by error correcting encoders 4A and 4B and which constitute each transmission block will be formed of odd and even information parity words as shown in the table illustrated in FIG. 6. For example, in transmission block #0, PCM words $W_0$, $W_{-62}$, $W_{-219}$ and $W_{-281}$, together with parity words $P_{-128}$, $Q_{-168}$, $P_{-347}$ and $Q_{-387}$ are transmitted. Together with these data words, a suitable CRC code word and a synchronizing word also are transmitted. All of these words are transmitted serially-by-word for recording on a suitable record medium. FIG. 7 represents the serially-transmitted words which constitute transmission block #0 ($n=0$).

One embodiment of decoding circuitry which may be used to recover the information words which are transmitted, or recorded, in the encoded form produced by the apparatus shown in FIG. 4 is illustrated in FIG. 8. This apparatus is comprised of a CRC check circuit 7, and a more detailed illustration of error correcting decoders 8A and 8B is provided. It is assumed that the transmission block which is transmitted, or recorded, serially-by-word is received, or reproduced, and the serial words are converted so as to be presented as a plurality of parallel words. More particularly, the even interleaved Q sub-block, comprised of even information word sequences $SW_0$ and $SW_{12}$, P-parity word sequence $SP_{10}$ and Q-parity word sequence $SQ_{10}$ are provided, parallel-by-word; and the odd interleaved Q sub-block, formed of odd information word sequences $SW_1$ and $SW_{13}$, together with odd P-parity word sequence $SP_{11}$ and odd Q-parity word sequence $SQ_{11}$ are provided parallel-by-word. In addition, the CRC word also is provided. All of these data words are supplied to CRC check circuit 7 whereat an error in the received transmission block is detected. If an error in the transmission block is detected, as in the aforedescribed manner, or as in the manner described in copending application Ser. No. 31,030, an error flag associated with all, or with selected ones, of the received data words is set. These error flags are represented by the broken line provided at the output of the CRC check circuit. The interleaved data words which constitute the even Q sub-block, together with their associated error flag signals, are supplied to error correcting decoder 8A; and the interleaved data words included in the odd Q sub-block, together with their associated error flag signals, are supplied to error correcting decoder 8B. As illustrated in FIG. 8, decoders 8A and 8B are substantially identical, and like components are identified by the same reference numerals. Nevertheless, since the odd and even data words are supplied to separate error correcting decoders, such odd and even data words undergo separate error-correction decoding.

The interleaved data words which comprise the even Q sub-block are selectively delayed by time delay circuits $19_1$, $19_2$ and $19_3$ so as to de-interleave these data words. The delays imparted by delay circuits $19_1$-$19_3$ are inversely related to the delays imparted by delay circuits $17_1$-$17_3$ in error correcting encoder 4A. Thus, the even information words included in sequence $SW_0$, which had undergone no delay in the encoder, are subjected to the greatest delay $3(D-d)$ in delay circuit $19_1$. The even information words included in sequence $SW_{12}$ are subjected to a delay of $2(D-d)$ in delay circuit $19_2$. The P-parity words included in sequence $SP_{10}$ are subjected to a delay of $(D-d)$ in delay circuit $19_3$. The Q-parity words included in sequence $SQ_{10}$, which had undergone the greatest delay in encoder 4A, are subjected to no delay in decoder 8A. Thus, delay circuits $19_1$-$19_3$ serve to de-interleave the data words which comprise the even Q sub-block. Such de-interleaved data words are supplied to Q-parity decoder 20 as sequences $SW_{10}$, $SW_{102}$, $SP_{100}$ and $SQ_{10}$. These data words exhibit substantially the same time alignment as was exhibited by the data words that had been supplied to parity word generator 18 in encoder 4A.

In error correcting decoder 8B, delay circuits $19_1$-$19_3$ serve the same function as in decoder 8A, that is, to de-interleave the data words which comprise the odd Q subblock. These de-interleaved data words, comprised of odd information words included in the sequences $SW_{11}$ and $SW_{103}$, the odd P-parity words included in sequence $SP_{101}$ and the odd Q-partiy words included in sequence $SQ_{11}$ are supplied to Q-parity decoder 20 in substantially the same time alignment as was exhibited by the data words that were supplied to Q-parity word generator 18 in encoder 4B.

The respective Q-parity decoders carry out an error-correction decoding operation to correct those erroneous data words whose associated error flag signals are set. For example, the de-interleaved data words included in sequences $SW_{10}$, $SW_{102}$, $SP_{100}$ and $SQ_{10}$, supplied to Q-parity decoder 20 in error correcting decoder 8A, may be represented as data words $W_{4(n-3D+3d)}$, $W_{4(n-3D+2d)+2}$, $P_{4(n-3D+d)}$ and $Q_{4(n-3D+3d)}$, which data words are summed, as by modulo 2 addition to obtain a syndrome. This syndrome then is used to correct the erroneous data word included in the Q sub-block. When the erroneous word is corrected, its associated error flag signal is cleared. It is seen that, since the error flag signals are supplied through the same delay circuits $19_1$-$19_3$ as the data words are supplied, then each de-interleaved data word will be accompanied by its associated error flag signal which is either set or reset depending upon whether an error in the transmission block in which that data word was contained was detected. Similarly, Q-parity decoder 20 in decoder 8B operates to correct an erroneous data word and to clear the error flag signal associated with that word.

It is possible that the data words in the Q sub-blocks supplied to the Q-parity decoders in decoders 8A and 8B may contain errors which exceed the error correcting ability of the parity decoders. In that event, one or more of the data words produced at the output of the even or odd Q-parity decoder may remain uncorrected. It is appreciated that the data words which are produced at the output of the Q-parity decoder constitute an interleaved P sub-block. Thus, the data words produced at the output of the Q-parity decoder in error correcting decoder 8A constitute an even interleaved P sub-block; and the data words produced at the outputs of Q-parity decoder 20 in error correcting decoder 8B constitute an odd interleaved P sub-block. One or more of the data words in each of these interleaved P sub-blocks may be erroneous, that is, such words may not have been corrected by the Q-parity decoder. The interleaved data words in the P sub-block are de-interleaved by delay circuits $21_1$ and $21_2$. These delay circuits impart delays of 2d and d, respectively, and are inversely related to the delay circuits $16_1$ and $16_2$ used in the error correcting encoders. It is appreciated that the even information word supplied to delay circuit $21_1$ in decoder 8A is the word $W_{4(n-3D+3d)}$, and delay circuit $21_1$ produces the delayed information word $W_{4(n-3D+d)}$. Similarly, the even information word supplied to delay circuit $21_2$ is $W_{4(n-3D+2d)+2}$, and this delay circuit produces a delayed word $W_{4(n-3D+d)+2}$. Hence, the even information words, as well as the even P-parity word, which are supplied to P-parity decoder 22 all are in time alignment and are constituted by the words $W_{4(n-3D+d)}$, $W_{4(n-3D+d)+2}$, and $P_{4(n-3D+d)}$. It is recalled that these even information and P-parity words constitute the P sub-block.

P-parity decoder 22 functions in a manner similar to Q-parity decoder 20. That is, the information and P-parity words supplied thereto are summed to produce a syndrome, and this syndrome is used to correct the information word which has been detected as being erroneous. That is, those information words whose associated error flag signals are set are corrected. When an erroneous information word is corrected, its associated error flag signal is reset.

A similar error correction operation is carried out by P-parity decoder 22 included in error correcting decoder 8B. Thus, the de-interleaved odd P sub-block is supplied to this odd P-parity decoder, and those information words which have been detected as being erroneous are corrected. Furthermore, the error flag which is associated with the erroneous odd information word is reset.

The corrected even information words produced at the outputs of P-parity decoder 22 are delayed by delay circuits $9_1$ and $9_2$, each delay circuit exhibiting a time delay of K. Thus, the even information words produced at the outputs of delay circuits $9_1$ and $9_2$ are in time alignment with the corrected odd information words produced at the outputs of P-parity decoder 22. Even-/odd assember 10 then re-arranges these information words in successive order, that is, in the order $W_{4n}$, $W_{4n+1}$, $W_{4n+2}$ and $W_{4n+3}$. These rearranged, corrected information words are supplied to error compensating circuit 11, shown in FIG. 8 as including interpolator circuit 11', whereat uncorrected information words are compensated by interpolation in the aforedescribed manner. That is, if, for example, even information word $W_{4n+2}$ remains uncorrected, as indicated by its associated error flag signal which has not been reset, an approximate value of this word is obtained by interpolating adjacent odd information words $W_{4n+1}$ and $W_{4n+3}$.

From the foregoing description, it is appreciated that, if CRC check circuit 7 detects an error in a received transmission block so as to set all of the error flags associated with the data words in that block, it is highly likely that only one error flag will be set in the de-interleaved Q sub-block supplied by delay circuits $19_1$-$19_3$ to Q-parity decoder 20. Moreover, even if more than one error flag signal accompanies these de-interleaved data words of the Q sub-block, there is a strong probability that only one error flag signal will be set in the de-interleaved P sub-block supplied by delay circuits $21_1$ and $21_2$ to P-parity encoder 22. Thus, by using an interleaving code technique, the likelihood of uncorrected errors, that is, the occurrence of errors which exceed the error correcting ability of the parity decoders, is minimized.

In the embodiment shown in FIG. 8, delay circuits $9_1$ and $9_2$ are provided downstream of error correcting decoder 8A to remove the delay which had been produced by delay circuits $5_1$ and $5_2$ in FIG. 4 or by delay circuits $5_1$-$5_4$ in FIG. 5. Alternatively, delay circuits may be provided upstream of decoder 8A, such as shown in FIG. 9, to delay each of the data words included in the even interleaved Q sub-block which is included in the received transmission block.

In the embodiment of FIG. 8, if it is assumed that, consistent with the example set out hereinabove, K=55, D=16 and d=2, then, for transmission block #n (n=42, 43 . . . 50, 51) the respective sequences $SW_{10}$, $SW_{102}$, $SP_{100}$ and $SQ_{10}$ supplied to the Q-parity decoder in error correcting decoder 8A, and the sequences $SW_{11}$, $SW_{103}$, $SP_{101}$ and $SQ_{11}$ supplied to the Q-parity decoder included in error correcting decoder 8B are comprised of the respective data words which are illustrated in FIG. 10. The horizontal broken lines which join the even data words represent corresponding even de-interleaved Q sub-blocks, and the broken horizontal lines which join the odd data words represent the odd de-interleaved Q sub-blocks. That is, when transmission block #42 is received, the even data words which are supplied to Q-parity decoder 20 are information words $W_0$ and $W_{-6}$, P-parity word $P_{-16}$ and Q-parity word $Q_0$. Likewise, when this transmission block #42 is received, the data words which are supplied to the odd Q-parity decoder are odd information words $W_{-219}$ and $W_{-255}$, odd P-parity word $P_{-235}$ and odd Q-parity word $Q_{-219}$.

The oblique solid lines which join two information words and one P-parity word, shown in FIG. 10, represent the de-interleaved P sub-blocks which are supplied to P-parity decoder 22. Thus, when transmission block #46 is received, the even P-parity decoder is supplied with even information words $W_0$ and $W_2$, which were produced at the outputs of the even Q-parity decoder when transmission blocks #42 and #44 were received, and with P-parity word $P_0$, which is produced at the output of the even Q-parity decoder when transmission block #46 is received. Similarly, when this transmission block #46 is received, the odd P-parity decoder is supplied with odd information words $W_{-219}$ and $W_{-217}$, and odd P-parity word $P_{-219}$.

It may be appreciated from the chart set out in FIG. 10 that each information word and each P-parity word is included in two sub-blocks: a Q sub-block and a P sub-block. These parity sub-blocks are independent of each other such that even if an erroneous word is present in, for example, the Q sub-block, and that error cannot be corrected, the erroneous word may, nevertheless, be corrected in the P sub-block. For example, let it be assumed that all of words $W_{16}$, $W_{10}$ and $P_0$ included in the even Q sub-block containing Q-parity word $Q_{16}$ are erroneous. Let it be further assumed that these three error words exceed the error correcting ability of the Q-parity decoder. Nevertheless, if P-parity words $P_8$ and $P_{16}$ are correct, and if information words $W_8$ and $W_{12}$ are correct, all of these words being included in different Q sub-blocks, then erroneous information words $W_{16}$ and $W_{10}$ may, nevertheless, be corrected in the P-parity decoder. Furthermore, it is recognized that the four data words which are included in a particular Q sub-block are recorded in interleaved fashion such that there is a small likelihood that two or more of such data words included in the same de-interleaved Q sub-block are erroneous.

This technique of interleaving information and error-correcting words such that each information word is included in two independent sub-blocks is known as a cross-interleaved code and, as may be appreciated, exhibits a very high error correcting ability.

The embodiments of error correcting decoders 8A and 8B, as shown in FIGS. 8 and 9, to decode information words which have been encoded in the cross-interleaved code are of a basic, fundamental construction. Various modifications to such decoders may be made to improve their error correcting ability. For example, the error correction operation which is carried out by Q-parity decoder 20 and P-parity decoder 22 may be repeated by another set of Q and P parity decoders. Thus, an additional Q-parity decoder may be provided, this additional Q-parity decoder being supplied with the output information words produced by P-parity decoder 22 and delayed outputs produced by Q-parity decoder 20. Then, the outputs produced by this additional Q-parity decoder may be supplied to an additional P-parity decoder, together with delayed information words produced at the output of P-parity decoder 22.

Also, instead of utilizing a cross interleaved decoder to decode the encoded information words, a cross word decoder may be used. In this type of error correcting decoder, if an error is present in a received transmission block, then the remainder which is obtained by CRC check circuit 7 (as described above) is compared to an auxiliary syndrome, the latter being formed by dividing the syndrome provided either in the Q-parity decoder or the P-parity decoder by the generation polynomial. This comparison results in detecting which data word in the received transmission block is erroneous. As yet another modification, this cross word decoding technique may be combined with the cross interleaved decoder to achieve error correction.

The manner in which the decoding apparatus shown in FIGS. 8 and 9 functions to recover information words from an edit tape of the type wherein $T_s$ represents the time at which the edit point is reached, and signals which are reproduced prior to time $T_s$ are derived from source A and signals which are reproduced subsequent to time $T_s$ are derived from source B, now will be described with reference to FIGS. 11A-11E. It is assumed that data words comprising the sequences $SW_0$, $SW_{12}$, $SP_{10}$, $SQ_{10}$, $SW_1$, $SW_{13}$, $SP_{11}$ and $SQ_{11}$ are encoded in the aforedescribed cross interleaved code as produced by the encoders shown in FIGS. 4 and 5. FIG. 11A represents the time relationship between the respective sequences supplied to each of the Q-parity decoders. It is seen that, in view of the delay 3(D-d) imparted to sequence $SW_0$ by time delay circuit $19_1$, delayed sequence $SW_{10}$ is delayed with respect to sequence $SQ_{10}$ by this time delay 3(D-d). Furthermore, those sequences which are represented by cross-hatched areas are supplied to the Q-parity decoders from tape 14B, whereas the areas that are not hatched represent those sequences which are supplied to the Q-parity decoders from tape 14A. Thus, at time $T_s$, corresponding to the edit point, sequences $SQ_{10}$ and $SQ_{11}$, which are not delayed, are supplied to the Q-parity decoders. However, at this time, since all of the remaining sequences are delayed by different amounts, such remaining sequences are constituted by data words which are reproduced from tape 14A. At delayed time (D-d) sequences $SP_{100}$ and $SP_{101}$ are reproduced from tape 14B. At a further delayed time 2(D-d), sequences $SW_{102}$ and $SW_{103}$ are reproduced from tape 14B. Finally, at delayed time 3(D-d), sequences $SW_{10}$ and $SW_{11}$ are reproduced from tape 14B. This delayed time 3(D-d) is equal to the interval $\alpha$. Thus, during the interval $T_s$ to $(T_s+\alpha)$, data words which are reproduced from both tapes are seen to coexist. That is, during this interval, some of the sequences are reproduced from tape 14A while others of the sequences are reproduced from tape 14B. Hence, during this interal $T_s$ to $(T_s+\alpha)$, the Q sub-blocks which are supplied to the Q-parity decoders are not constituted by data words which are reproduced from the same tape. Consequently, during this interval, error correction cannot be performed by the Q-parity decoder.

It is recalled that, after error correction, the even information words are delayed by K time units in time delay circuits $9_1$ and $9_2$. The odd information words are not delayed. Taking this delay K into account, FIG. 11B illustrates the effect of this delay K on sequences $SW_{10}$ and $SW_{102}$. FIG. 11C continues to show that sequences $SW_{11}$ and $SW_{103}$ are not subject to this delay K, and illustrates the relationship between the even information word sequences, which are delayed, and the odd information word sequences. Because of this delay K, time point $T_s$ appears as a delayed time point $T_{sk}$ and it is seen that, in the interal $T_{sk}$ to $(T_{sk}+\alpha)$, which is equal to the time delay 3(D-d), even information words reproduced from tapes 14A and 14B coexist. Consequently, during this interval the Q-parity decoder, which is supplied with such even information words, cannot carry out proper error correction.

Thus, because of the coexistence of data which is reproduced from both tapes, error correction of the odd information words cannot be achieved during $T_s$ to $(T_s+\alpha)$; and error correction of the even information words cannot be achieved during the interval $T_{sk}$ to $(T_{sk}+\alpha)$.

If it is assumed that, even if multiple errors occur in the data words which are reproduced prior to time $T_s$, the error correcting ability of the decoders shown in FIGS. 8 and 9 is not surpassed, then correct even information words $[E_a]$ and correct odd information words $[O_a]$ derived from tape 14A can be obtained, as shown in FIG. 11D. Furthermore, since the even Q sub-blocks are reproduced from tape 14A in the interval from time point $T_s$ to time point $T_{sk}$, error correcting decoder 8A functions to produce correct even information words $[E_a]$ during this interval. However, and as noted above, from time point $T_s$ onward, the odd Q sub-block contain data words which are reproduced from tapes 14A and 14B. That is, each odd Q sub-block that is recovered from time $T_s$ onward contains coexisting data derived from both tapes. This means that, from time $T_s$ onward, correct odd information words cannot be recovered. Nevertheless, since correct even information words $[E_a]$ are reproduced, approximate odd information words $O'_a$ may be produced by interpolator 11', as by interpolating adjacent, correct even information words to produce an approximate odd information word $O'_a$. Thus, as shown in FIG. 11D, in the interval from $T_s$ to $T_{sk}$, correct even information words are recovered and interpolated odd information words are produced.

With respect to the information recovered from tape 14B, it is appreciated that, from time point $(T_{sk}+\alpha)$ onward, data words are reproduced from tape 14B only. Thus, from this point onward, correct even information words [$E_b$] and correct odd information words [$O_b$] are produced. Furthermore, since each odd Q sub-block that is recovered from time point ($T_s+\alpha$) onward contains data words reproduced from tape 14B only, decoder 8B functions to produce correct odd information words [$O_b$] from this point. However, since none of the even Q sub-blocks which are recovered prior to time point ($T_{sk}+\alpha$) contains data words reproduced from tape 14B only, it is appreciated that correct even information words $E_b$ derived from tape 14B cannot be produced until then. Hence, in the interval ($T_s+\alpha$) to ($T_{sk}+\alpha$), interpolator 11' operates to produce approximate correct even information words $E'_b$ by interpolating the odd information words [$O_b$] which are generated. The correct odd information words [$O_b$] and the interpolated even information words $E'_b$ which are derived from tape 14B in the interval ($T_s+\alpha$) to ($T_{sk}+\alpha$) are illustrated in FIG. 11E. During the interval ($T_s+\alpha$) to ($T_{sk}$), information words derived from tapes 14A and 14B coexist. Accordingly, during this interval, the aforementioned cross-fading operation is carried out in order to blend the information which is recovered from these tapes. If the information words are PCM signals, then the audio information recovered from tape 14A is blended or merged with the audio information which is recovered from tape 14B.

The foregoing discussion has concentrated on what previously has been referred to as the multi-error section in the interval $T_s$ to ($T_s+\alpha$) and in the interval $T_{sk}$ to ($T_{sk}+\alpha$). It is recalled that a portion of this multi-error section also extends in the interval ($T_s-\alpha$) to $T_s$ and in the interval ($T_{sk}-\alpha$) to $T_{sk}$. In the former interval, correct even information words [$E_a$] are recovered, and uncorrected odd information words may be replaced by interpolated odd information words $O'_a$, as discussed above with respect to FIG. 3. Similarly, in the latter interval, correct odd information words [$O_b$] are recovered and the even information words $E'_b$ must be interpolated. Furthermore, in this latter interval, correct even information words [$E_a$] might not be obtained. Nevertheless, the cross-fading operation, at least during the interval ($T_s+\alpha$) to ($T_{sk}-\alpha$) will serve to blend or merge the data from tapes 14A and 14B satisfactorily.

Figure 12:
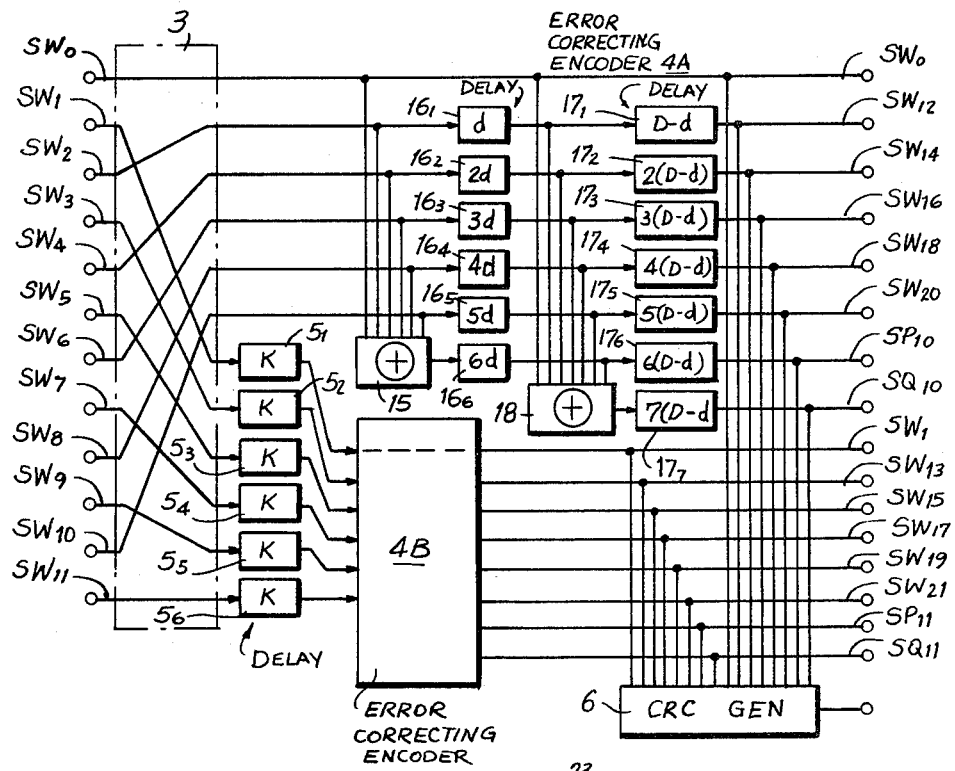
FIG. 12 is a block diagram of another embodiment of an encoder which may be used with the apparatus shown in FIG. 1.

Referring now to FIG. 12, error correcting encoder 4A is illustrated for use in conjunction with a sequence of input information words comprised of twelve words, represented by sequences $SW_0$, $SW_1$, ... $SW_{10}$ and $SW_{11}$. Even/odd distributing circuit 3 distributes these information words into a sub-block of six even information words and into a sub-block of six odd information words. It may be appreciated that the embodiment shown in FIG. 12 is similar to that discussed above with respect to FIG. 4, except that each sub-block in the FIG. 4 embodiment had been comprised of two information words, whereas each sub-block in the FIG. 12 embodiment is comprised of six information words. Nevertheless, the operation of the embodiment shown in FIG. 12 is substantially similar to that described above with respect to FIG. 4. Hence, in the FIG. 12 embodiment, P-parity generator 15 generates the P-parity word in response to each of the six information words included in the sub-block supplied thereto, and respective ones of these information words, as well as the P-parity word, are delayed by different amounts d, 2d, ... 6d in time delay circuits $16_1$, $16_2$, ... $16_6$, respectively, thereby resulting in an interleaved P sub-block. As before, the interleaved information and P-parity words included in this interleaved P sub-block are supplied to Q-parity generator 18 which generates the Q-parity word in response thereto. The interleaved data words of the P sub-block, together with the generated Q-parity words, comprise the Q sub-block, and delay circuits $17_1$, $17_2$, ... $17_6$ and $17_7$ impart different time delays to respective ones of these data words, thereby forming an interleaved Q sub-block. It is appreciated that error correcting encoder 4B in FIG. 12 functions in a manner similar to that of error correcting encoder 4A to produce an odd interleaved Q sub-block. Of course, delay circuits $5_1$–$5_6$ delay each odd information word by K time units so as to time-displace the odd information words from the even information words.

In the embodiment of FIG. 12, the transmission block produced by error correcting encoders 4A and 4B is comprised of twelve information words, four parity words, the CRC code word and a synchronizing word. Thus, in the embodiment of FIG. 12, N=6 and M=2. It may be appreciated that a decoder, similar to that shown in FIGS. 8 and 9, but compatible with the encoder shown in FIG. 12, may be provided to substantially recover the original information words.

Figure 13:
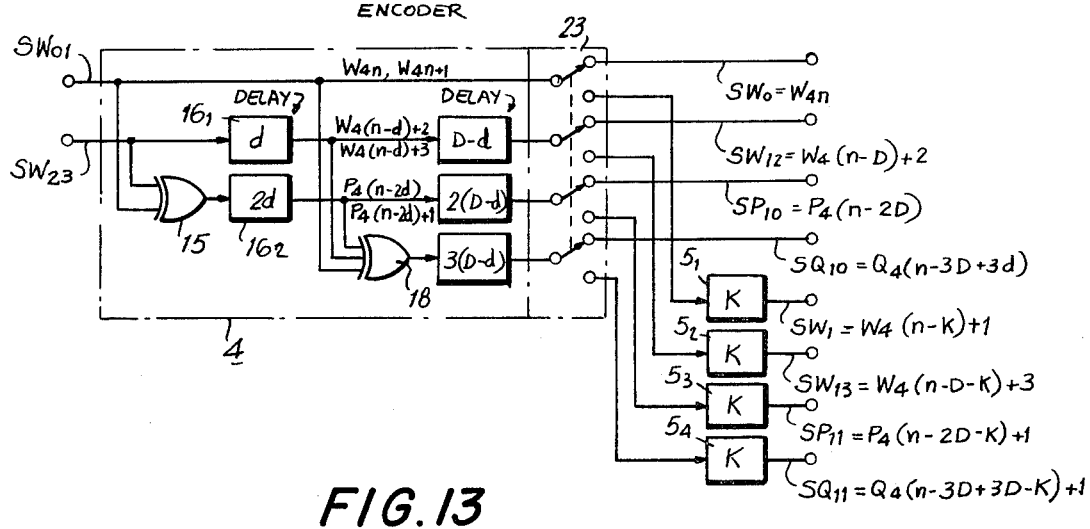
FIG. 13 is a block diagram of yet another embodiment of an encoder which may be used with the apparatus of FIG. 1.

In the embodiments of the error detecting encoder described hereinabove, it has been assumed that 1-to-2N channel converter 2 (FIG. 1) converts a single channel of sequential information words into 2N parallel channels, and the N even information words are distributed, in parallel, to error correcting encoder 4A while the N odd information words are distributed, in parallel, to error correcting encoder 4B. FIG. 13 represents an alternative embodiment wherein the sequence of information words are distributed to N parallel channels whereat, at one timing period N parallel even information words are provided and at the next timing period N odd information words are provided. Thus, rather than being provided with N even information words and N odd information words concurrently, as in the aforedescribed embodiments, N even information words are followed by N odd information words such that even and odd information words are provided alternately. In the embodiment shown in FIG. 13, two parallel channels are provided $SW_{01}$ and $SW_{23}$, with channel $SW_{01}$ being supplied with successive information words $W_{4n}$ and $W_{4n+1}$ in successive timing periods; and with channel $SW_{23}$ provided with information words $W_{4n+2}$ and $W_{4n+3}$ in successive timing periods. For convenience, it may be recognized that, during even timing periods, information words $W_{4n}$ and $W_{4n+2}$ are provided at channels $SW_{01}$ and $SW_{23}$, respectively; and during odd timing periods, information words $W_{4n+1}$ and $W_{4n+3}$ are provided at channels $SW_{01}$ and $SW_{23}$, respectively.

In the embodiment shown in FIG. 13, error correcting encoder 4 is similar to either error correcting encoder 4A or error correcting encoder 4B shown in FIGS. 4 and 5. Hence, during even timing periods, encoder 4 processes the even information words in the very same manner as was described above with respect to encoder 4A in, for example, FIG. 5. During odd timing periods, encoder 4 processes the odd information words in substantially the same manner as encoder 4B, discussed above with respect to FIG. 5. Thus, at each even timing period, encoder 4 produces an even interleaved Q sub-block, comprised of two interleaved even information words, an interleaved P-parity word and a Q-parity word. During each odd timing period, encoder 4 produces an odd interleaved Q sub-block, comprised of two interleaved odd information words, an interleaved P-parity word and a Q-parity word.

The successive even and odd Q sub-blocks produced by encoder 4 are supplied, parallel-by-word, to switching circuit 23. This switching circuit is shown schematically as having a plurality of movable contacts, each connected to receive a respective interleaved word in the Q sub-blocks supplied thereto, and each movable contact selectively engages either one of a pair of fixed contacts, this pair of fixed contacts being referred to as even and odd contacts, respectively. A switch control signal (not shown) operates switching circuit 23 such that, during each even timing period, all of the movable contacts engage their corresponding even fixed contacts, and during each odd timing period, all of the movable contacts engage their respective odd fixed contacts. As illustrated, the odd fixed contacts are coupled to time delay circuits $5_1$–$5_4$, respectively, such that the respective words which constitute each odd Q sub-block are delayed by K time units. Hence, it is appreciated that the encoder shown in FIG. 13 produces interleaved even Q sub-blocks at the upper group of output terminals, the respective words included in such even interleaved Q sub-blocks being comprised of sequences $SW_0$, $SW_{12}$, $SP_{10}$ and $SQ_{10}$; and the encoder produces odd interleaved Q sub-blocks at the group of lower output terminals, each odd Q sub-block being formed of sequences $SW_1$, $SW_{13}$, $SP_{11}$ and $SQ_{11}$. Thus, the embodiment shown in FIG. 13 generates the same transmission block as was generated by the embodiment shown in FIG. 5. Suitable storage devices, such as shift registers, or the like, may be connected to the output terminals of the embodiment in FIG. 13 so as to provide proper timing synchronism between the even and odd Q sub-blocks.

Figure 14:
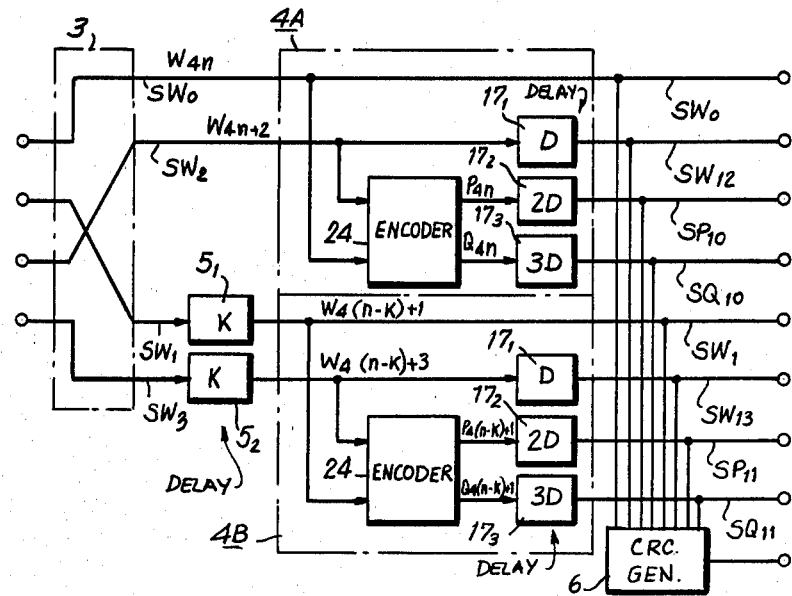
FIG. 14 is a block diagram of yet another encoder which may be used with the present invention.

Encoders 4A and 4B in the embodiments discussed above with respect to FIGS. 4, 5, 12 and 13 all are cross interleaved code encoders. FIG. 14 illustrates error correcting encoders 4A and 4B as including matrix encoders 24, particularly, b-adjacent code encoders. Each b-adjacent encoder generates a P-parity word and a Q-parity word. Encoder 24, included in even error correcting encoder 4A, generates even parity words $P_{4n}$, which may be represented as $$P_{4n} = W_{4n} + W_{4n+2},$$

P-parity words $P_{4n}$ are supplied to time delay circuit $17_2$ whereat they are delayed by 2D time units. Encoder 24 included in odd error correcting encoder 4B generates $P_{4(n-k)+1}$ parity words, which may be expressed as $$P_{4(n-k)+1} = W_{4(n-k)+1} + W_{4(n-k)+3},$$

these parity words being supplied to time delay circuit $17_2$. It may be appreciated that encoders 24 may generate the P-parity words in the same manner as described above with respect to P-parity generator 15.

Encoders 24 also generate Q-parity words, which may be expressed as:

$$Q_{4n} = T^2 W_{4n} \oplus T W_{4n+2}$$

$$Q_{4(n-k)+1} = T^2 W_{4(n-k)+1} \oplus T W_{4(n-k)+3}$$

In the foregoing equations, T represents a generation matrix (16×16) when each information word is comprised of 16 bits. Thus, T may be expressed as:

$$T = \begin{bmatrix} 0\ 0 \cdots \cdots 0 & g0 \\ & g1 \\ & g2 \\ I_{15} & \cdot \\ & \cdot \\ & \cdot \\ & g15 \end{bmatrix}$$

In the foregoing matrix, gi is included in generation polynomial G(x), which is a polynomial over GF(2) which is expressed as:

$$G(x) = \sum_{i=0}^{15} gi\, x^i \quad g0 = g15 = 1$$

Also, in the foregoing matrix, $I_{15}$ is an identity matrix of the fifteenth degree.

Time delay circuits $17_1$–$17_3$ in error correcting encoders 4A and 4B serve to interleave the information and parity words. The even sub-block produced by encoder 4A and the odd sub-block produced by encoder 4B are supplied to CRC generator 6; and the resultant even and odd sub-blocks, together with the CRC code word and a synchronizing word are combined to form the transmission block.

Figure 15:
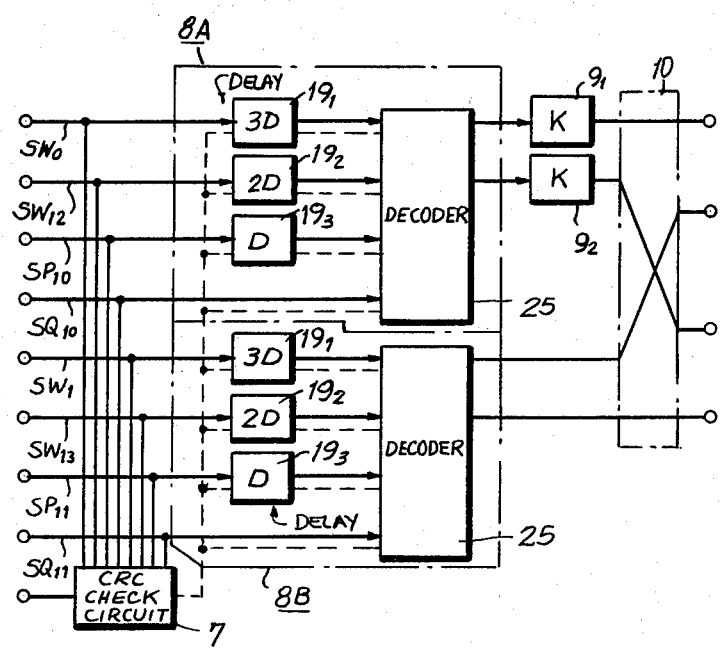
FIG. 15 is a block diagram of a decoder which may be used to recover the information words which are encoded by the encoder shown in FIG. 14.

FIG. 15 illustrates an embodiment of error correcting decoders 8A and 8B which are compatible with the encoders shown in FIG. 14. As in the previously described embodiments of decoders 8A and 8B, the even interleaved Q sub-block and the odd interleaved Q sub-block, together with the CRC code word included in the received transmission block all are supplied to CRC check circuit 7. The respective even and odd sub-blocks also are supplied to decoders 8A and 8B. If an error is present in the received transmission block, then the error flag signals associated with the respective words of the even and odd sub-blocks are set, all as described above.

Each error correcting decoder is provided with time delay circuits $19_1$–$19_3$ to de-interleave the respective even and odd Q sub-blocks supplied thereto. Thus, sequences $SW_0$, $SW_{12}$, $SP_{10}$, $SQ_{10}$, $SW_1$, $SW_{13}$, $SP_{11}$ and $SQ_{11}$ undergo respectively different time delays which are inversely related to the time delays that were imparted at encoders 4A and 4B. Each error correcting decoder also includes a b-adjacent decoder 25 which receives the de-interleaved Q sub-block and corrects erroneous data words if CRC check circuit 7 indicates that an error is present in the received transmission block. If two information words in the same de-interleaved Q sub-block are indicated as being erroneous, b-adjacent decoder 25 may correct both words.

The b-adjacent code has a symbol over $GF(2^b)$, which is a Galois field having ($2^b$) elements, and is a generic designation of codes which are capable of correcting errors in a bit group. For example, the generalized Hamming code, the Reed-Solomon code are examples of b-adjacent codes, and also are matrix codes. Although the implementation of the b-adjacent code is relatively complex in construction, this code nevertheless offers very high error correcting ability.

If the encoder shown in FIG. 14 is used to record PCM signals on a tape which is edited, information which is recorded on either side of the edit point can be reproduced in the manner discussed above with respect to FIG. 11. Since the error correcting ability of the b-adjacent code is advantageously high, some errors which may be present in the interval from $T_s$ to $(T_s+\alpha)$, whose time duration now will be equal to 3D, as well as some errors which may be present in the interval $T_{sk}$ to $(T_{sk}+\alpha)$ may be correctable.

It now may be appreciated that various advantages are derived from the present invention. For example, if a number of odd or even information words cannot be corrected such uncorrectable words may, nevertheless, be replaced by good approximations therefor merely by interpolating adjacent even or odd information words, respectively, which are adjacent the erroneous word. For example, if word $W_3$ cannot be corrected, it may be approximated by interpolating words $W_2$ and $W_4$. Furthermore, the present invention does not require a large number of redundant words for error correction, as in the double recording method, and, moreover, the implementation of this invention does not require complicated circuitry. Also, when the present invention is used in a PCM recorder, a single channel of information can be recorded in a single track. Consequently, a large number of information channels can be recorded in a reasonable number of tracks, which means that the width of the tape need not be overly large. That is, multiple tracks are not needed to record a single channel of information. Still further, if this invention is used in a PCM recorder, editing of the record medium can be carried out without high losses of information due to multi-error sections in the vicinity of the edit points. The error correcting ability of this invention is relatively high; and even in those areas where the error level exceeds the error correcting ability, error compensation nevertheless can be carried out with reasonable adequacy.

While the present invention has been particularly shown and described with reference to certain preferred embodiments, it should be readily apparent to those of ordinary skill in the art that various changes and modifications in form and details may be made without departing from the spirit and scope of the invention. For example, if this invention is used in a PCM recorder, the recording medium need not be limited solely to a magnetic tape. Rather, information may be recorded on an optical PCM disk by, for example, a laser beam; and this recorded information may be reproduced and adequately decoded so as to recover the original information. Also, in addition to the various error detecting codes which have been discussed above, the present invention, in its broader aspects, may utilize a parity code, a full-adder code, and the like. It is intended that the appended claims be interpreted as including the foregoing as well as other changes and modifications.

What is claimed is:

1. A method of communicating a sequence of digital information words, comprising the steps of: separating said information words into a sequence of odd information words and a sequence of even information words; time-displacing the separated odd and even information words from each other by a predetermined amount; encoding said odd information words in an error-correcting code; separately encoding said even information words in an error-correcting code; combining said encoded time-displaced odd and even information words into a transmission block; and transmitting said transmission block.

2. The method of claim 1 wherein said sequence of digital information words is formed of 2N information words, and each of said sequences of odd and even information words is formed of N information words.

3. The method of claim 2 further comprising the steps of generating an error detecting code word in response to the error-correcting encoded odd and even information words; and inserting said error detecting code word into said transmission block.

4. The method of claim 2 wherein each of said steps of encoding the respective odd and even information words in an error correcting code comprises generating an error-correcting word in response to said N information words, interleaving said N information words and said error-correcting word; and inserting the interleaved words into said transmission block.

5. The method of claim 4 wherein said step of interleaving is comprised of delaying by different predetermined time delays respective ones of said N information words and said error-correcting word.

6. The method of claim 4 wherein said step of generating an error-correcting word comprises generating a parity word in response to said N information words.

7. The method of claim 4 wherein said step of encoding the respective odd and even information words in an error-correcting code further comprises generating a second error-correcting word in response to the interleaved N information words and first-mentioned error-correcting word; further interleaving the N information words and the first and second error-correcting words; and inserting the further interleaved words into said transmission block.

8. The method of claim 7 wherein said step of further interleaving is comprised of delaying by different predetermined time delays respective ones of the interleaved N information words and first error-correcting word and also said second error-correcting word.

9. The method of claim 7 wherein said step of generating said second error-correcting word comprises generating a second parity word in response to the interleaved N information words and first error-correcting word.

10. The method of claim 2 wherein each of said steps of encoding the respective odd and even information words in an error correcting code comprises generating a P-parity word and a Q-parity word in response to said N information words, the Q-parity word being a function of a generating matrix of $(b \times b)$, where b is the bit length of each word; interleaving the N information words and the P-parity and Q-parity words; and inserting the interleaved words into said transmission block.

11. The method of claim 1 wherein said step of transmitting said transmission block comprises transmitting the encoded time-displaced odd and even information words serially by word.

12. The method of claim 1 further comprising the steps of receiving said transmission block; decoding said odd and even information words to correct errors therein; removing the time displacement between the decoded odd and even information words; approximating a correct information word if that information word contains an uncorrected error therein by interpolating adjacent decoded odd information words to approximate a correct even information word and by interpolating adjacent decoded even information words to approximate a correct odd information word; and recovering a corrected sequence of information words formed of the decoded and approximated information words.

13. The method of claim 12 wherein the received transmission block includes an error-detecting code word, and further comprising the steps of detecting errors in said received odd and even information words in response to said error-detecting code word and said information words and using the detection of said errors to correct erroneous information words.

14. The method of claim 13 wherein the received transmission block includes an odd error-correcting word interleaved with said odd information words and an even error-correcting word interleaved with said even information words, and said step of decoding comprises de-interleaving said odd and even error-correcting words from said transmission block, and using the odd and even error-correcting words to correct odd and even information words which have been detected as being erroneous.

15. The method of claim 14 wherein the odd and even information words included in the received transmission block are arranged as interleaved odd information and error-correcting words and interleaved even information and error-correcting words, and said step of decoding further comprises de-interleaving the interleaved odd information words and de-interleaving the interleaved even information words.

16. The method of claim 15 wherein the received transmission block further includes a second odd error-correcting word interleaved with said interleaved odd information and first-mentioned error-correcting words, and a second even error-correcting word interleaved with said interleaved even information and first-mentioned error-correcting words, the interleaved odd information and error-correcting words forming an odd interleaved sub-block and the interleaved even information and error-correcting words forming an even interleaved sub-block; and said step of decoding further comprises de-interleaving said odd interleaved sub-block and said even interleaved sub-block to recover said second odd error-correcting word and said interleaved odd information and first error-correcting words and to recover said second even error-correcting word and said interleaved even information and first error-correcting words; using said second odd error-correcting word to correct at least one odd information and first error-correcting word which has been detected as being erroneous; and using said second even error-correcting word to correct at least one even information and first error-correcting word which has been detected as being erroneous.

17. A method of communicating a sequence of digital information words, comprising the steps of separating said information words into a sequence of odd information words and into a sequence of even information words; time-displacing the separated odd and even information words from each other by a predetermined amount; generating at least one odd error-correcting word in response to said odd information words; generating at least one even error-correcting word in response to said even information words; selectively delaying said odd information and error-correcting words to form an odd sub-block of interleaved odd words; selectively delaying said even information and error-correcting words to form an even sub-block of interleaved even words; generating an error detecting code in response to said odd and even sub-blocks; combining said odd and even sub-blocks and said error detecting code into a transmission block; and transmitting said transmission block.

18. The method of claim 17 wherein each of said odd and even error-correcting words is a parity word.

19. The method of claim 18 wherein each of said odd and even sub-blocks is a P sub-block containing a P-parity word; and further comprising generating an odd Q-parity word in response to the interleaved words of said odd P sub-block; generating an even Q-parity word in response to the interleaved words of said even P sub-block; further selectively delaying the words of said odd P sub-block and delaying said odd Q-parity word to form an odd Q sub-block of interleaved odd words; further selectively delaying the words of said even P sub-block and delaying said even Q-parity word to form and even Q sub-block of interleaved even words; and combining said odd and even Q sub-blocks into said transmission block.

20. The method of claim 17 further comprising the steps of receiving said transmission block; using said error detecting code and the words of said odd and even sub-blocks to detect errors which may be present in the sub-blocks; selectively delaying the words in said odd sub-block and in said even sub-block to de-interleave said odd information and error-correcting words and to de-interleave said even information and error-correcting words; using the at least one de-interleaved odd error-correcting word to correct odd information words which have been detected as being erroneous and using the at least one de-interleaved even error-correcting word to correct even information words which have been detected as being erroneous; approximating a correct odd or even information word to replace an uncorrectable information word by interpolating adjacent correct even or odd information words, respectively; and recovering a corrected sequence of information words.

21. The method of claim 20 wherein each received odd and even sub-block is a Q sub-block formed of a Q-parity word interleaved with a P sub-block and even P sub-block is formed of a P-parity word and information words which have been selectively delayed to form interleaved words; and wherein said steps of de-interleaving and error-correcting comprise selectively delaying the words in said odd Q sub-block and in said even Q sub-block to de-interleave said odd information words, said Q-parity word and said P-parity word of each odd Q sub-block and to de-interleave said even information words, said Q-parity word and said P-parity word of each even Q sub-block; using the odd Q-parity word to correct odd information and P-parity words which have been detected as being erroneous so as to form a corrected odd P sub-block and using the even Q-parity word to correct those even information and P-parity words which have been detected as being erroneous so as to form a corrected even P sub-block; selectively delaying the words in said corrected odd P sub-block and in said corrected even P sub-block to de-interleave said odd information and P-parity words of said odd P sub-block and to de-interleave said even information and P-parity words of said even P sub-block; and using the odd P-parity word to correct those de-interleaved odd information words which remain erroneous and using the even P-parity word to correct those de-interleaved even information words which remain erroneous.

22. A method of recovering digital information words from a record medium having an edit point thereon such that the information words recorded on either side of said edit point are derived from different sources, said digital information words being recorded in successive transmission blocks, each block being formed of odd information words encoded in an error-correcting code and even information words separately encoded in an error-correcting code, the error-correcting encoded odd and even information words having been time-displaced from each other by a predetermined amount, said method comprising the steps of reproducing said transmission block from said record medium; decoding said odd and even information words to correct errors therein; removing the time displacement between the decoded odd and even information words; approximating correct odd or even information words reproduced within a predetermined range of said edit point to replace uncorrectable information words by interpolating adjacent correct even or odd information words, respectively; cross-fading the information words reproduced from one side of said edit point with the information words reproduced from the other side of said edit point during said predetermined range; and recovering a corrected sequence of information words from the corrected and cross-faded information words.

23. Apparatus for communicating a sequence of digital information words comprising: distributing means for distributing said information words into a sequence of odd information words and a sequence of even information words; time displacement means for imparting a relative time-displacement between said odd and even information words; odd and even error-correcting encoding means for encoding the time-displaced odd and even information words in error correcting codes; and means for transmitting the encoded, time-displaced odd and even information words as a transmission block.

24. The apparatus of claim 23 further comprising error detecting code generating means for receiving said encoded, time-displaced odd and even information words to generate an error detecting word in response thereto, said error detecting word being transmitted in said transmission block.

25. The apparatus of claim 23 wherein said odd and even error-correcting encoding means is formed of separate encoding means, each comprising error-correcting word generating means for generating at least one error-correcting word in response to the information words supplied thereto, and time delay means for selectively delaying the information and at least one error-correcting words to form a sub-block comprised of interleaved information and error-correcting words.

26. The apparatus of claim 25 wherein said error-correcting word generating means comprises a parity generator for generating a parity word.

27. The apparatus of claim 25 wherein said error-correcting word generating means and time delay means comprise a P-parity generator for generating a P-parity word, said information words supplied to said P-parity generator and said P-parity word forming a P sub-block; first time delay means for selectively delaying the words of said P sub-block to interleave the information and P-parity words therein; a Q-parity generator for generating a Q-parity word in response to the interleaved words of said P sub-block, the interleaved words of said P sub-block and said Q-parity word forming a Q sub-block; and second time delay means for selectively delaying the words of said Q sub-block to interleave the information, P-parity and Q-parity words therein.

28. The apparatus of claim 27 wherein said time displacement means is coupled upstream of one of said P-parity generators to impart a time displacement to the information words supplied thereto.

29. The apparatus of claim 27 wherein said time displacement means is coupled downstream of one of said second time delay means to impart a time displacement to the interleaved words of a corresponding Q sub-block.

30. The apparatus of claim 23 wherein said distributing means is provided with at least first and second outputs, each providing alternating odd and even information words in synchronism; and said odd and even error-correcting encoding means comprises error correcting word generating means coupled to said at least first and second outputs for generating at least one odd error-correcting word in response to odd information words provided at said outputs and generating at least one even error-correcting word in response to even information words provided at said outputs; time delay means for selectively delaying the information words provided at said outputs and the error-correcting word generated in response thereto to form a sub-block comprised of interleaved information and error-correcting words; and switch means for receiving each sub-block, said switch means having first and second sets of output terminals and operative when odd information words are provided at the outputs of said distributing means to couple an odd sub-block to said first set of output terminals and operative when even information words are provided at the outputs of said distributing means to couple an even sub-block to said second set of output terminals.

31. The apparatus of claim 30 wherein said time displacement means is coupled to one set of said output terminals.

32. The apparatus of claim 30 wherein said error-correcting word generating means and time delay means comprise a P-parity generator for generating a P-parity word, the information words supplied to said P-parity generator and said P-parity word forming a P sub-block; first time delay means for selectively delaying the words of said P sub-block to interleave the information and P-parity words therein; a Q-parity generator for generating a Q-parity word in response to the interleaved words of said P sub-block, the interleaved words of said P sub-block and said Q-parity word forming a Q sub-block; and second time delay means for selectively delaying the words of said Q sub-block to interleave the information, P-parity and Q-parity words therein, each Q sub-block being supplied to said switch means.

33. The apparatus of claim 25 wherein said error-correcting word generating means comprises b-adjacent encoding means responsive to the information words supplied thereto to generate first and second parity words, one of said parity words being expressed as $T^2W_n \oplus TW_{n+2}$, where $W_n$ is an information word formed of b bits and T is produced by a (b×b) generation matrix.

34. Apparatus for recovering a sequence of digital information words from a received transmission block comprised of odd and even sub-blocks of odd and even information words, respectively, the odd and even sub-blocks being encoded in an error-correcting code and the odd and even information words being time-displaced from each other, said apparatus comprising receiving means for receiving each said transmission block; odd and even error-correcting decoding means for decoding correct odd and even information words from the received odd and even sub-blocks; time-adjustment means for removing the time-displacement between the corrected odd and even information words; error compensating means for replacing an erroneous, uncorrectable odd or even information word with an approximate correct information word derived from interpolating adjacent even or odd information words, respectively; and re-forming means for re-forming a sequence of correct odd and even information words.

35. The apparatus of claim 34 wherein said received transmission block additionally includes an error detecting word, and further comprising error detecting means responsive to said error detecting word and to the words in said odd and even sub-blocks to detect if said latter words are erroneous.

36. The apparatus of claim 35 wherein said error detecting means includes means for generating error flag signals to identify those respective words in said odd and even sub-blocks which are erroneous.

37. The apparatus of claim 35 wherein each received odd and even sub-block is comprised of plural information words and at least one error-correcting word, said plural information and error-correcting words being interleaved with each other; and wherein each of said odd and even error-correcting decoding means comprises de-interleave means for de-interleaving the plural information and error-correcting words in the respective sub-block, and decoding means for using the de-interleaved at least one error-correcting word to correct erroneous information words.

38. The apparatus of claim 37 wherein said at least one error-correcting word is a parity word and said decoding means is a parity decoder.

39. The apparatus of claim 35 wherein each received odd and even sub-block is comprised of a Q sub-block including a Q-parity word interleaved with a P sub-block, the latter including plural information words interleaved with a P-parity word; and wherein each odd and even error-correcting decoding means comprises first time delay means to selectively delay the words in said sub-block for de-interleaving the Q-parity word and the words comprising the P sub-block, Q-parity decoding means for using the de-interleaved Q-parity word to correct erroneous words comprising said P sub-block, second time delay means to selectively delay the words in said corrected P sub-block for de-interleaving the P-parity word and the information words, and P-parity decoding means for using the de-interleaved P-parity word to correct erroneous information words.

40. The apparatus of claim 37 wherein said at least one error-correcting word comprises first and second parity words, one of said parity words being expressed as $T^2W_n \oplus TW_{n+2}$, where $W_n$ is an information word formed of b bits and T is produced by a (b×b) generation matrix; and wherein said decoding means comprises a b-adjacent code decoder.

41. The apparatus of claim 34 wherein said time-adjustment means comprises time delay means coupled downstream of one of said odd and even error-correcting decoding means for delaying corrected information words.

42. The apparatus of claim 34 wherein said time-adjustment means comprises time delay means coupled upstream of one of said odd and even error-correcting decoding means for delaying uncorrected information words.

43. Apparatus for recovering a sequence of digital information words recorded on a record medium having an edit point thereon, the information words recorded on either side of said edit point being derived from different sources and the information words being recorded as successive transmission blocks each comprised of odd and even sub-blocks of odd and even information words, respectively, the odd and even sub-blocks being encoded in an error-correcting code and the odd and even information words being time-displaced from each other, said apparatus comprising reproducing means for reproducing said transmission blocks from said record medium; odd and even error-correcting decoding means for decoding correct odd and even information words from the received off and even sub-blocks; time-adjustment means for removing the time-displacement between the corrected odd and even information words; error compensating means for replacing an erroneous, uncorrectable odd or even information word reproduced within a predetermined range of said edit point with an approximate correct information word derived from interpolating adjacent even or odd information words, respectively; means for cross-fading the corrected, replaced information words reproduced from one side of said edit point with the corrected, replaced information words reproduced from the other side of said edit point during said predetermined range; and recovering a corrected sequence of information words from the corrected and cross-faded information words.

* * * * *